(12) United States Patent
Lee et al.

(10) Patent No.: US 12,395,988 B2
(45) Date of Patent: Aug. 19, 2025

(54) METHOD AND APPARATUS FOR PERFORMING SENSING FOR SIDELINK COMMUNICATION IN NR V2X

(71) Applicant: LG Electronics Inc., Seoul (KR)

(72) Inventors: Seungmin Lee, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 590 days.

(21) Appl. No.: 17/769,958

(22) PCT Filed: Oct. 19, 2020

(86) PCT No.: PCT/KR2020/014264
§ 371 (c)(1),
(2) Date: Apr. 18, 2022

(87) PCT Pub. No.: WO2021/075936
PCT Pub. Date: Apr. 22, 2021

(65) Prior Publication Data
US 2022/0377725 A1 Nov. 24, 2022

Related U.S. Application Data

(60) Provisional application No. 62/916,259, filed on Oct. 17, 2019.

(51) Int. Cl.
*H04W 72/20* (2023.01)
*H04W 92/18* (2009.01)

(52) U.S. Cl.
CPC .......... *H04W 72/20* (2023.01); *H04W 92/18* (2013.01)

(58) Field of Classification Search
CPC ..... H04W 72/20; H04W 92/18; H04W 76/14; H04W 74/0808
See application file for complete search history.

(56) References Cited

U.S. PATENT DOCUMENTS

| 2018/0255444 A1 | 9/2018 | Chae et al. | |
| 2021/0243749 A1* | 8/2021 | Hoang | H04W 24/08 |
| 2022/0201654 A1* | 6/2022 | Lee | H04W 72/20 |

FOREIGN PATENT DOCUMENTS

| CN | 108028740 A | 5/2018 |
| CN | 109565791 A | 4/2019 |

(Continued)

OTHER PUBLICATIONS

Intel Corporation, "UE-Autonomous Resource Allocation for NR V2X Sidelink Communication," R1-1908635, Presented at 3GPP TSG RAN WG1 Meeting #98, Prague, Czech Republic, Aug. 26-30, 2019, 28 pages (Year: 2019).*

(Continued)

*Primary Examiner* — Austin J Moreau
(74) *Attorney, Agent, or Firm* — Fish & Richardson P.C.

(57) ABSTRACT

According to an embodiment of the present disclosure, a method for a first device to perform sidelink communication is provided. The method may comprise the steps of: selecting, on the basis of first sensing, a first resource for transmitting a PSCCH or a PSSCH to a second device; determining, on the basis of second sensing, whether the first resource overlaps with a resource reserved by the second device or a third device; re-evaluating, on the basis of the first resource, whether to transmit the PSCCH or the PSSCH; and transmitting the PSCCH or the PSSCH to the second device on the basis of the re-evaluation.

20 Claims, 29 Drawing Sheets

(56) References Cited

FOREIGN PATENT DOCUMENTS

| CN | 109804682 A | 5/2019 |
|---|---|---|
| KR | 20190103321 | 9/2019 |

OTHER PUBLICATIONS

CAICT, "Considerations on the resource allocation for NR sidelink Mode2," R1-1909349, Presented at 3GPP TSG RAN WG1 Meeting #98, Prague, Aug. 26-30, 2019, 5 pages.
Fraunhofer HHI & Fraunhofer IIS, "Resource Allocation for Mode 2 NR V2X," R2-1910536, Presented at 3GPP TSG-RAN WG2 Meeting #107, Prague, Czech Republic, Aug. 26-30, 2019, 8 pages.
LG Electronics, "Discussion on resource allocation for Mode 2," R1-1908902, Presented at 3GPP TSG RAN WG1 #98, Prague, CZ, Aug. 26-30, 2019, 14 pages.
Vivo, "Discussion on mode 2 resource allocation mechanism," R1-1908150, Presented at 3GPP TSG RAN WG1 #98, Prague, CZ, Aug. 26-30, 2019, 16 pages.
Office Action in Chinese Appln. No. 202080084958.7, mailed on Jun. 24, 2024, 15 pages (with English translation).
Extended European Search Report in European Appln. No. 20876323.5, mailed on Dec. 13, 2022, 12 pages.
Intel Corporation, "UE-Autonomous Resource Allocation for NR V2X Sidelink Communication," R1-1908635, Presented at 3GPP TSG RAN WG1 Meeting #98, Prague, Czech Republic, Aug. 26-30, 2019, 28 pages.
Intel Corporation, "Sidelink Resource Allocation Design for NR V2X Communication," R1-1904296, Presented at 3GPP TSG RAN WG1 Meeting #96bis, Xi'an, China, Apr. 8-12, 2019, 15 pages.
Intel Corporation, "Summary#2 for AI 7.2.4.2.2 Mode-2 Resource Allocation," R1-1909785, Presented at 3GPP TSG RAN WG1 Meeting #98, Prague, Czech Republic, Aug. 26-30, 2019, 34 pages.

\* cited by examiner

METHOD AND APPARATUS FOR PERFORMING SENSING FOR SIDELINK COMMUNICATION IN NR V2X

CROSS-REFERENCE TO RELATED APPLICATIONS

This application is a National Stage application under 35 U.S.C. § 371 of International Application No. PCT/KR2020/014264, filed on Oct. 19, 2020, which claims the benefit of U.S. Provisional Application No. 62/916,259, filed on Oct. 17, 2019. The disclosures of the prior applications are hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

The present disclosure provides a method for communication between devices (or UEs) based on V2X communication, and device(s) (or UE(s)) performing the method.

The present disclosure provides a method for performing a sensing for sidelink communication in NR V2X, and device(s) (or UE(s)) performing the method.

Technical Solutions

Based on an embodiment of the present disclosure, a method for performing, by a first device, sidelink (SL) communication may be provided. The method may comprise: selecting a first resource for transmitting a physical sidelink control channel (PSCCH) or a physical sidelink shared channel (PSSCH) to a second device, based on a first sensing; determining that the first resource is overlapped with a resource reserved by the second device or a third device, based on a second sensing; performing re-evaluation to determine whether or not to transmit the PSCCH or the PSSCH based on the first resource; and transmitting, to the second device, the PSCCH or the PSSCH based on the re-evaluation, wherein an end time of the second sensing is related to a slot related to the first resource, a pre-configured first offset and a pre-configured second offset, wherein a first time which is determined based on a time before the first offset from the first slot represents a time related to the re-evaluation, and wherein a second time before the second offset from the first time is related to the end time of the second sensing.

Based on an embodiment of the present disclosure, a first device configured to perform sidelink (SL) communication may be provided. The first device may comprise: at least one memory storing instructions; at least one transceiver; and at least one processor connected to the at least one memory and the at least one transceiver. The at least one processor may execute the instructions to: select a first resource for transmitting a physical sidelink control channel (PSCCH) or a physical sidelink shared channel (PSSCH) to a second device, based on a first sensing; determine that the first resource is overlapped with a resource reserved by the second device or a third device, based on a second sensing; perform re-evaluation to determine whether or not to transmit the PSCCH or the PSSCH based on the first resource; and control the at least one transceiver to transmit, to the second device, the PSCCH or the PSSCH based on the re-evaluation, wherein an end time of the second sensing is related to a slot related to the first resource, a pre-configured first offset and a pre-configured second offset, wherein a first time which is determined based on a time before the first offset from the first slot represents a time related to the re-evaluation, and wherein a second time before the second offset from the first time is related to the end time of the second sensing.

Based on an embodiment of the present disclosure, an apparatus (or chip (set)) configured to control a first user equipment (UE) may be provided. The apparatus may comprise: at least one processor; and at least one memory connected to the at least one processor and storing instructions. The at least one processor may execute the instructions to: select a first resource for transmitting a physical sidelink control channel (PSCCH) or a physical sidelink shared channel (PSSCH) to a second UE, based on a first sensing; determine that the first resource is overlapped with a resource reserved by the second UE or a third UE, based on a second sensing; perform re-evaluation to determine whether or not to transmit the PSCCH or the PSSCH based on the first resource; and transmit, to the second UE, the PSCCH or the PSSCH based on the re-evaluation, wherein an end time of the second sensing is related to a slot related to the first resource, a pre-configured first offset and a pre-configured second offset, wherein a first time which is determined based on a time before the first offset from the first slot represents a time related to the re-evaluation, and wherein a second time before the second offset from the first time is related to the end time of the second sensing.

Based on an embodiment of the present disclosure, a non-transitory computer-readable storage medium storing instructions may be provided. The instructions, when executed, may cause a first device to: select a first resource for transmitting a physical sidelink control channel (PSCCH) or a physical sidelink shared channel (PSSCH) to a second device, based on a first sensing; determine that the first resource is overlapped with a resource reserved by the second device or a third device, based on a second sensing; perform re-evaluation to determine whether or not to transmit the PSCCH or the PSSCH based on the first resource; and transmit, to the second device, the PSCCH or the PSSCH based on the re-evaluation, wherein an end time of the second sensing is related to a slot related to the first resource, a pre-configured first offset and a pre-configured second offset, wherein a first time which is determined based on a time before the first offset from the first slot represents a time related to the re-evaluation, and wherein a second time before the second offset from the first time is related to the end time of the second sensing.

Based on an embodiment of the present disclosure, a method for performing, by a second device, sidelink (SL) communication may be provided. The method may comprise: receiving a PSCCH or a PSSCH from a first device, wherein, based on a first sensing by the first device, a first resource for transmission of the PSCCH or the PSSCH is selected, wherein, based on a second sensing by the first device, it is determined that the first resource is overlapped with a resource reserved by the second device or a third device, wherein re-evaluation is performed by the first device to determine whether or not to transmit the PSCCH or the PSSCH based on the first resource, wherein, based on the re-evaluation by the first device, the PSCCH or the PSSCH is transmitted from the first device to the second device, wherein an end time of the second sensing is related to a slot related to the first resource, a pre-configured first offset and a pre-configured second offset, wherein a first time which is determined based on a time before the first offset from the first slot represents a time related to the re-evaluation, and wherein a second time before the second offset from the first time is related to the end time of the second sensing.

Based on an embodiment of the present disclosure, a second device configured to perform sidelink (SL) communication may be provided. The first device may comprise: at least one memory storing instructions; at least one transceiver; and at least one processor connected to the at least one memory and the at least one transceiver. The at least one processor may execute the instructions to: control at least one transceiver to receive a PSCCH or a PSSCH from a first device, wherein, based on a first sensing by the first device, a first resource for transmission of the PSCCH or the PSSCH is selected, wherein, based on a second sensing by the first device, it is determined that the first resource is overlapped with a resource reserved by the second device or a third device, wherein re-evaluation is performed by the first device to determine whether or not to transmit the PSCCH or the PSSCH based on the first resource, wherein, based on the re-evaluation by the first device, the PSCCH or the PSSCH is transmitted from the first device to the second device, wherein an end time of the second sensing is related to a slot related to the first resource, a pre-configured first offset and a pre-configured second offset, wherein a first time which is determined based on a time before the first offset from the first slot represents a time related to the re-evaluation, and wherein a second time before the second offset from the first time is related to the end time of the second sensing.

Effects of the Disclosure

Based on the present disclosure, V2X communication between devices (or UEs) can be efficiently performed.

Based on the present disclosure, the UE can not only implement operations (e.g., processing of an additional sensing result, reselection of transmission resource) necessary for the re-evaluation operation with reasonable complexity, but also achieve performance improvement due to performing the re-evaluation operation.

DESCRIPTION OF EXEMPLARY EMBODIMENTS

Figure 1:
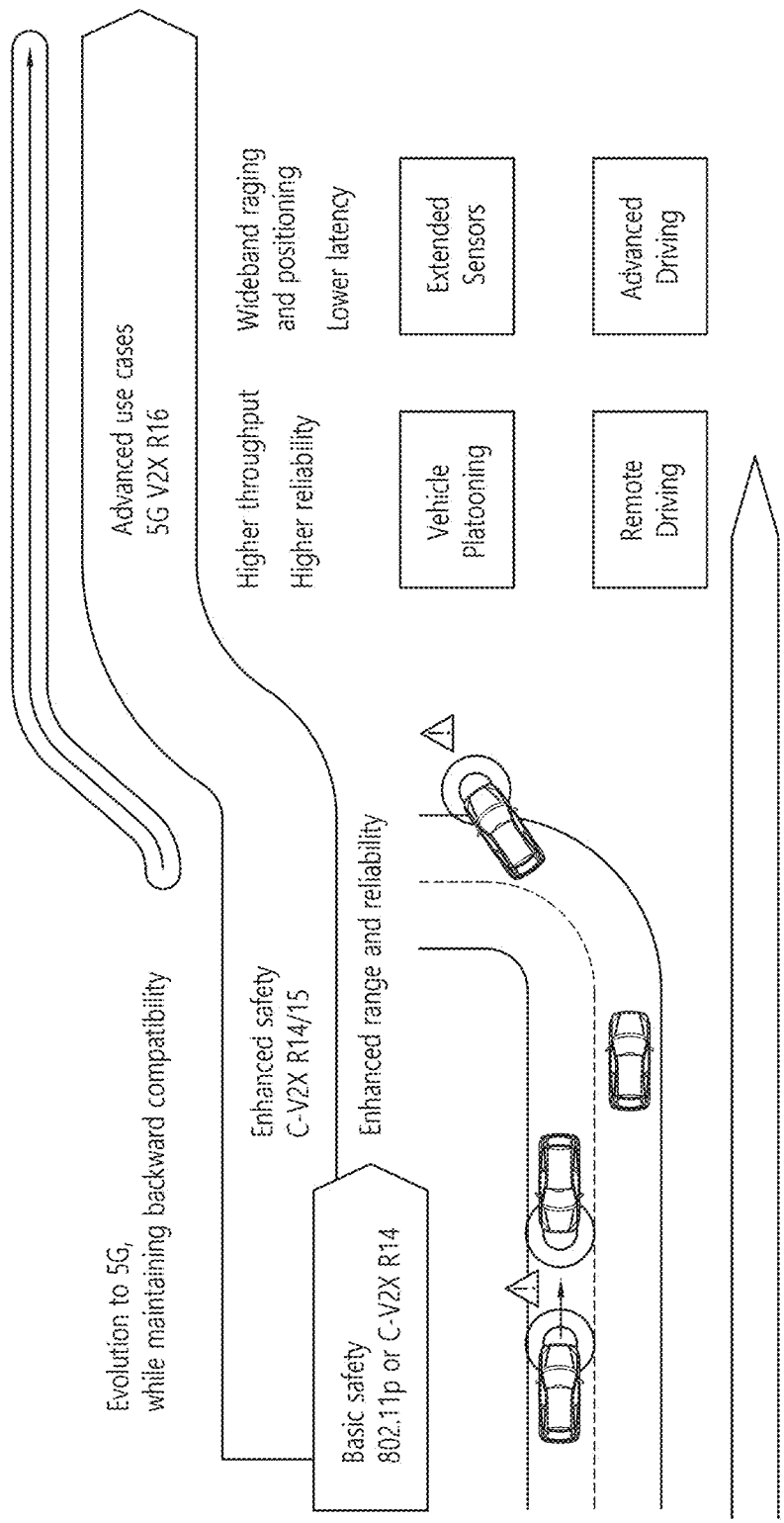
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
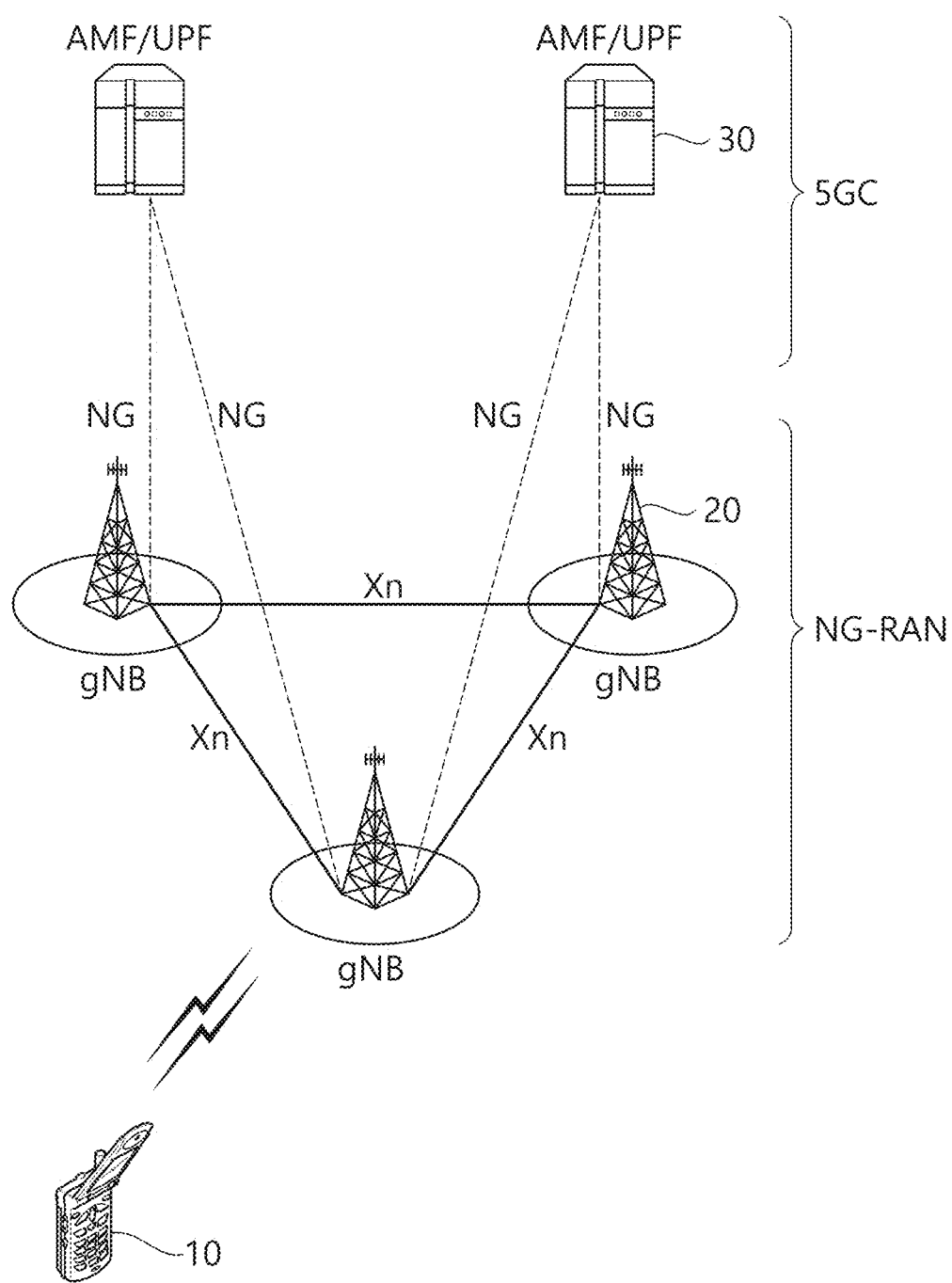
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
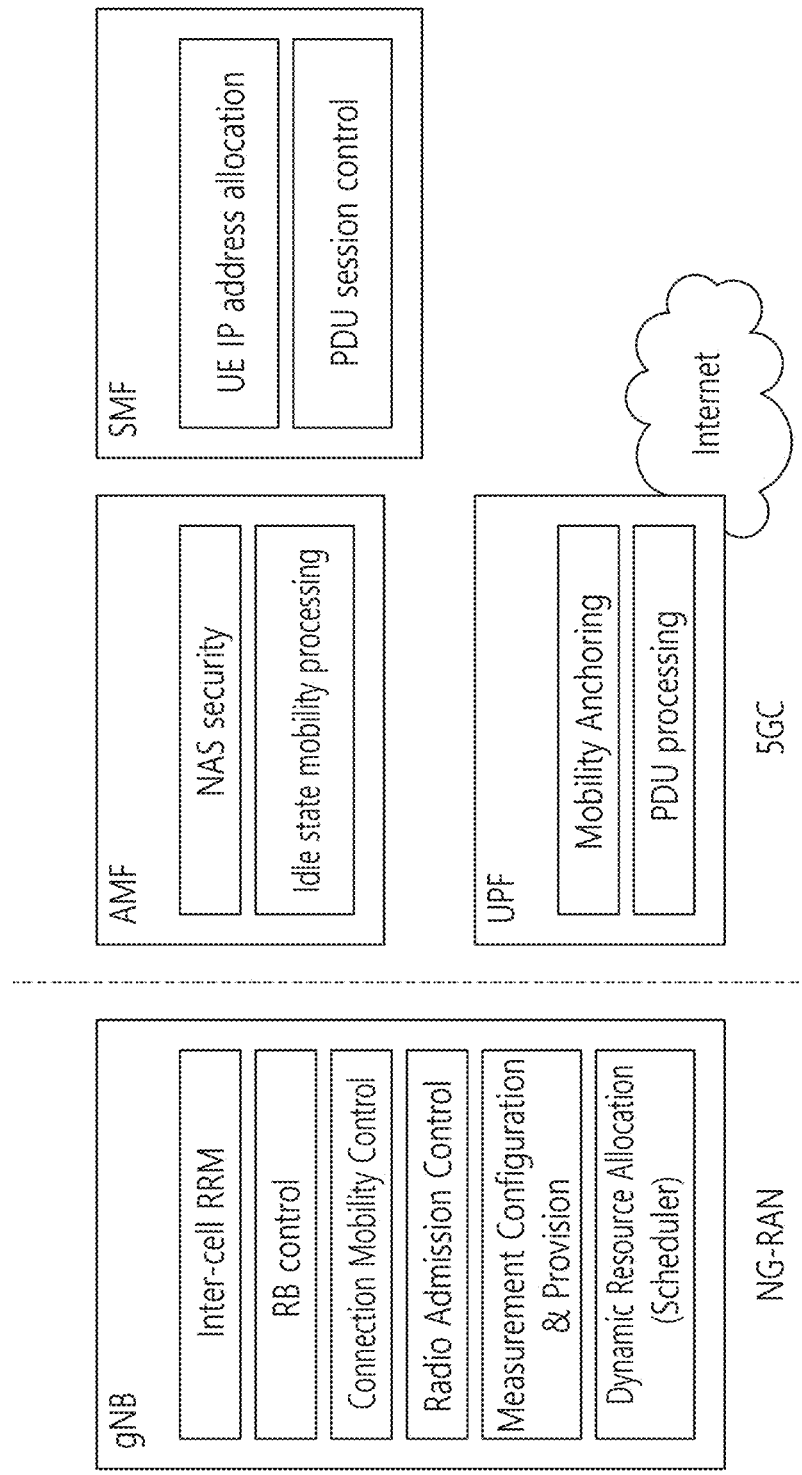
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4A:
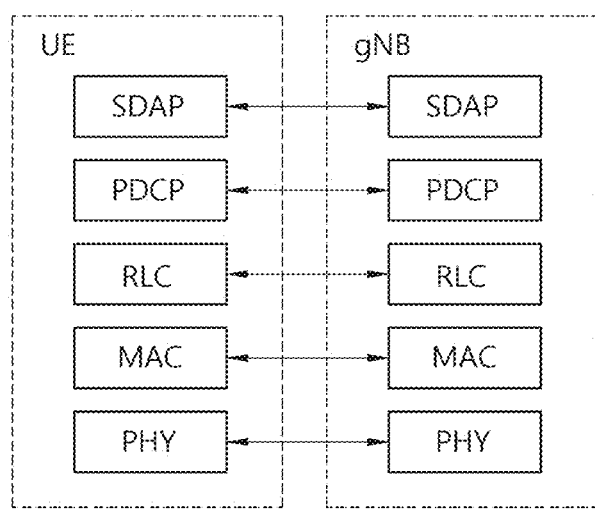
FIGS. 4A and 4B show a radio protocol architecture, based on an embodiment of the present disclosure.
Figure 4B:
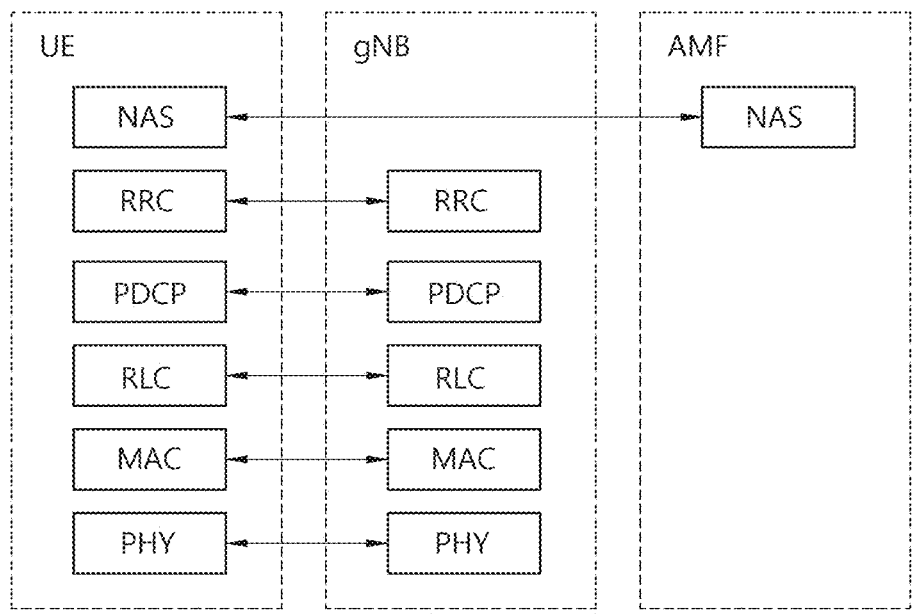

FIGS. 4A and 4B show a radio protocol architecture, based on an embodiment of the present disclosure. The embodiment of FIGS. 4A and 4B may be combined with various embodiments of the present disclosure. Specifically, FIG. 4A shows a radio protocol architecture for a user plane, and FIG. 4B shows a radio protocol architecture for a control plane. The user plane corresponds to a protocol stack for user data transmission, and the control plane corresponds to a protocol stack for control signal transmission.

Referring to FIGS. 4A and 4B, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
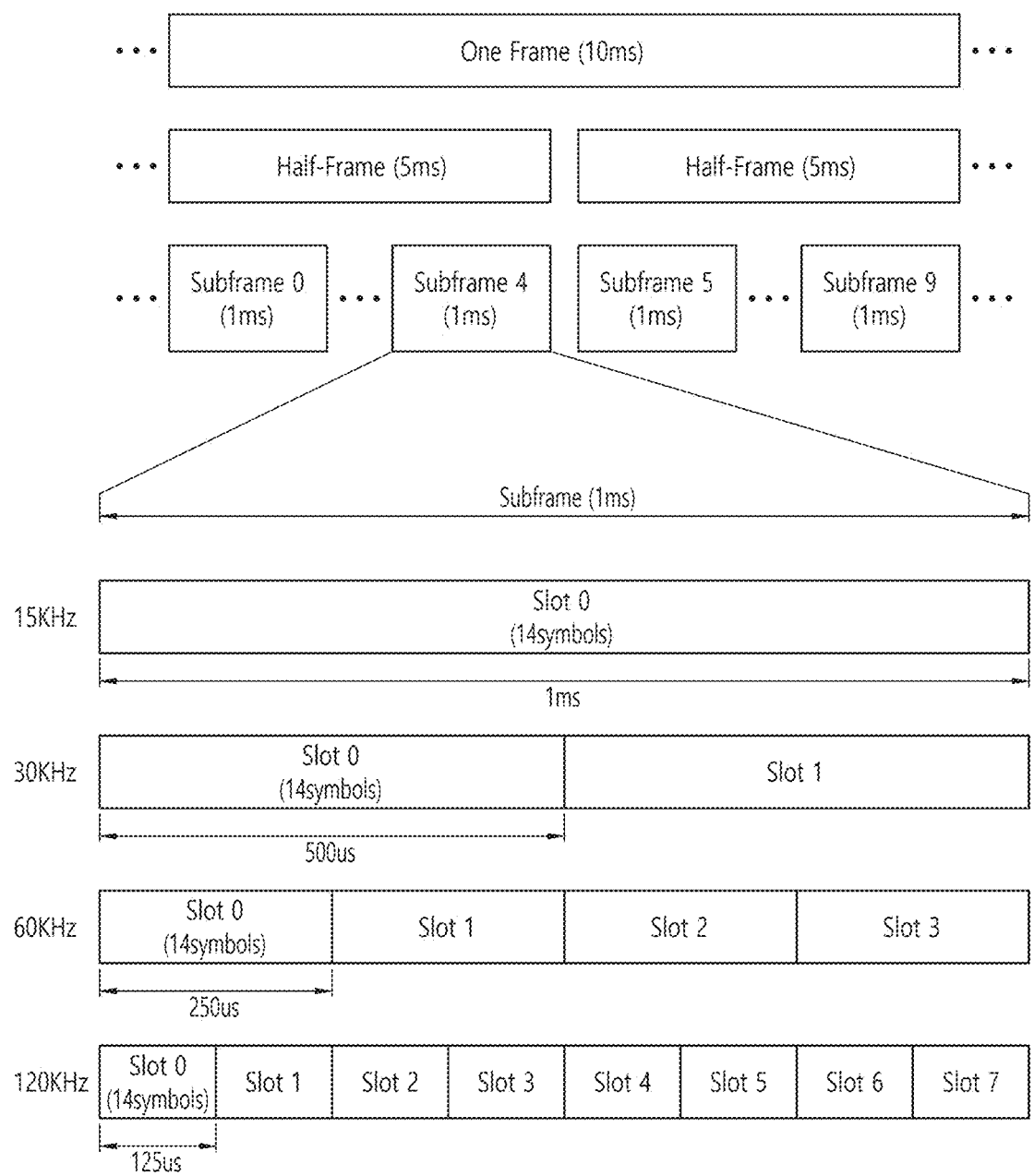
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
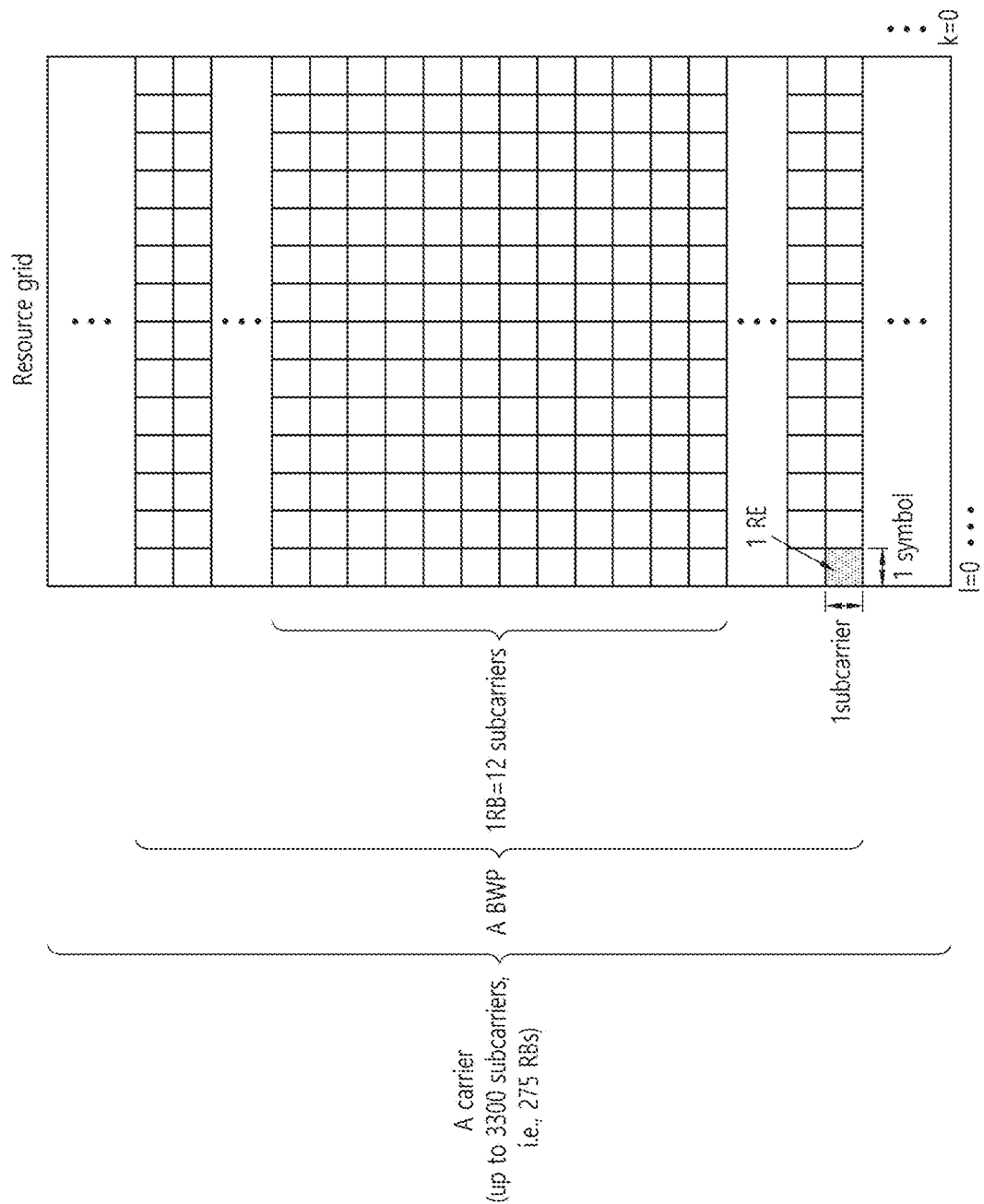
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
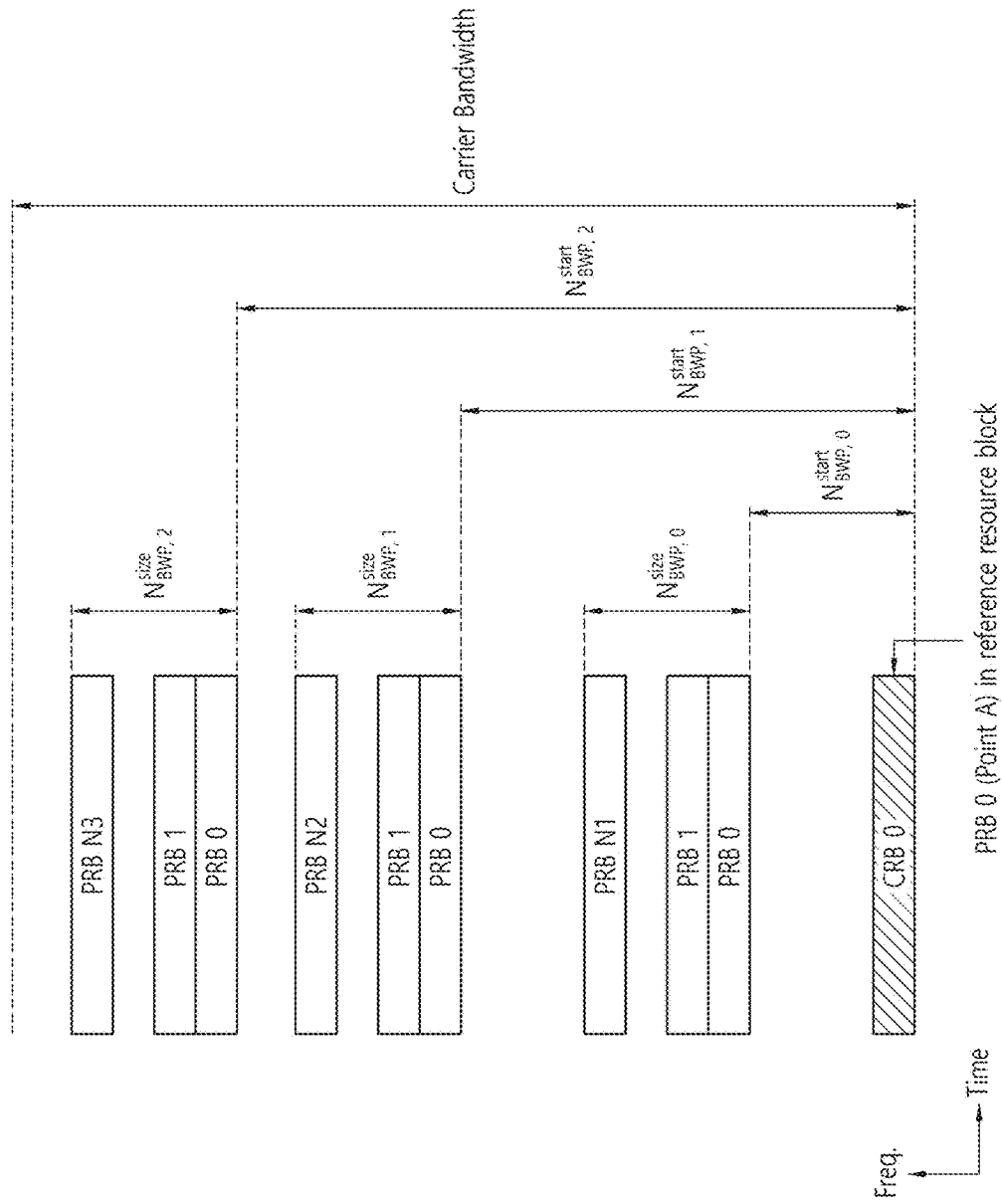
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8A:
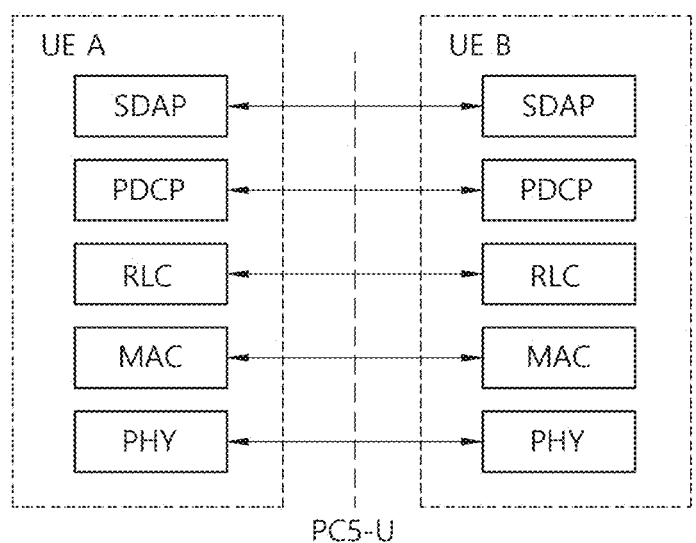
FIGS. 8A and 8B show a radio protocol architecture for a SL communication, based on an embodiment of the present disclosure.
Figure 8B:
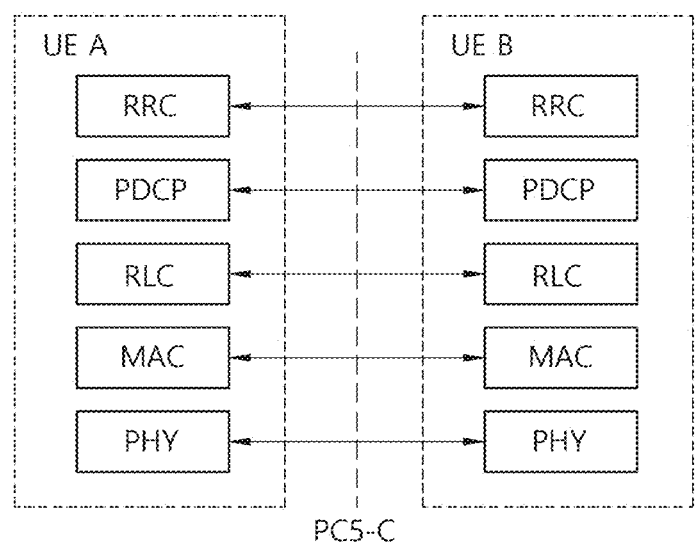

FIGS. 8A and 8B show a radio protocol architecture for a SL communication, based on an embodiment of the present disclosure. The embodiment of FIGS. 8A and 8B may be combined with various embodiments of the present disclosure. More specifically, FIG. 8A shows a user plane protocol stack, and FIG. 8B shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
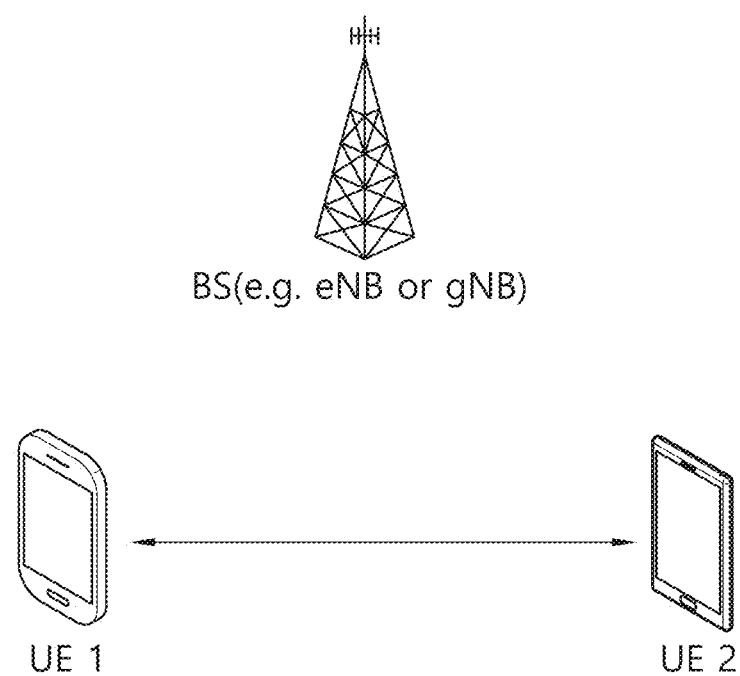
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10A:
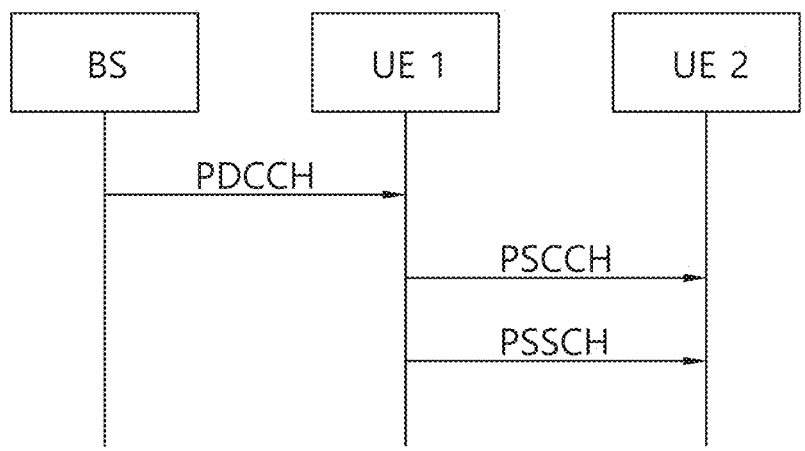
FIGS. 10A and 10B show a procedure of performing V2X or SL communication by a UE based on a transmission mode, based on an embodiment of the present disclosure.
Figure 10B:
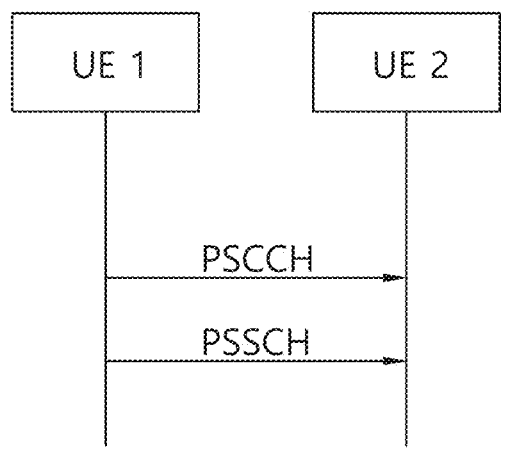

FIGS. 10A and 10B show a procedure of performing V2X or SL communication by a UE based on a transmission mode, based on an embodiment of the present disclosure. The embodiment of FIGS. 10A and 10B may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10A shows a UE operation related to an LTE transmission mode 1 or an LTE transmission mode 3. Alternatively, for example, FIG. 10A shows a UE operation related to an NR resource allocation mode 1. For example, the LTE transmission mode 1 may be applied to general SL communication, and the LTE transmission mode 3 may be applied to V2X communication.

For example, FIG. 10B shows a UE operation related to an LTE transmission mode 2 or an LTE transmission mode 4. Alternatively, for example, FIG. 10B shows a UE operation related to an NR resource allocation mode 2.

Referring to FIG. 10A, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10B, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11A:
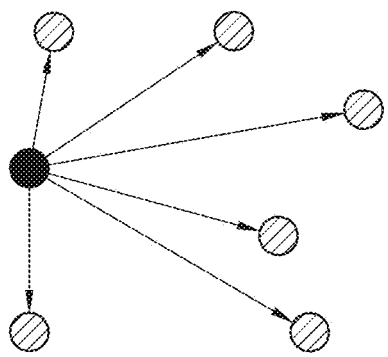
FIGS. 11A to 11C show three cast types, based on an embodiment of the present disclosure.
Figure 11B:
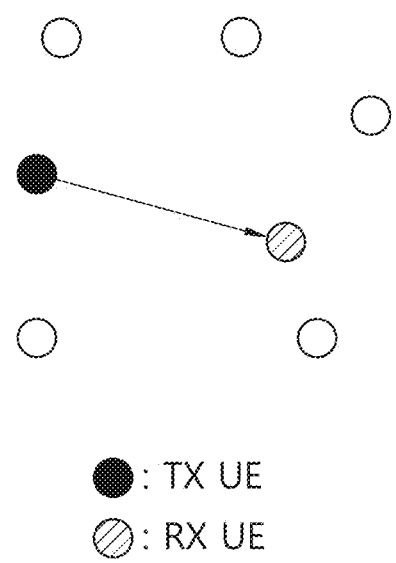
Figure 11C:
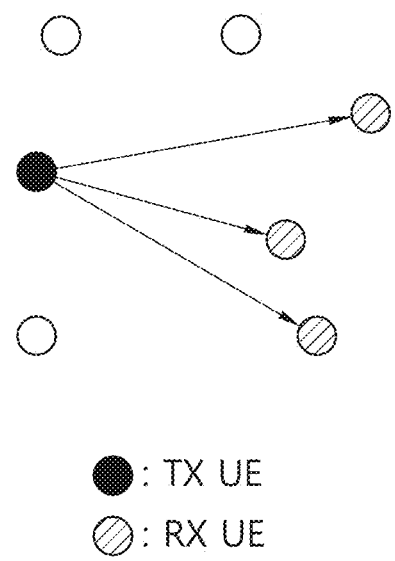

FIGS. 11A to 11C show three cast types, based on an embodiment of the present disclosure. The embodiment of FIGS. 11A to 11C may be combined with various embodiments of the present disclosure. Specifically, FIG. 11A shows broadcast-type SL communication, FIG. 11B shows unicast type-SL communication, and FIG. 11C shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in SL communication, a UE needs to efficiently select resource(s) for SL transmission. Hereinafter, based on various embodiments of the present disclosure, a method for a UE to efficiently select resource(s) for SL transmission and an apparatus supporting the same will be described. In various embodiments of the present disclosure, SL communication may include V2X communication.

At least one of the methods that are proposed based on the various embodiments of the present disclosure may be applied to at least one of unicast communication, groupcast communication, and/or broadcast communication.

At least one of the methods that are proposed based on the various embodiments of the present disclosure may be applied not only to PC5 interface or SL interface (e.g., PSCCH, PSSCH, PSBCH, PSSS/SSSS, and so on) based SL communication or V2X communication but also to Uu interface (e.g., PUSCH, PDSCH, PDCCH, PUCCH, and so on) based SL communication or V2X communication.

In the various embodiments of the present disclosure, receiving operation(s) of the UE may include decoding operation(s) and/or receiving operation(s) of SL channel(s) and/or SL signal(s) (e.g., PSCCH, PSSCH, PSFCH, PSBCH, PSSS/SSSS, and so on). Receiving operation(s) of the UE may include decoding operation(s) and/or receiving operation(s) of WAN DL channel(s) and/or WAN DL signal(s) (e.g., PDCCH, PDSCH, PSS/SSS, and so on). Receiving operation(s) of the UE may include sensing operation(s) and/or channel busy ratio (CBR) measuring operation(s). In the various embodiments of the present disclosure, sensing operation(s) of the UE may include PSSCH-RSRP measuring operation(s) based on PSSCH DM-RS sequence(s), PSSCH-RSRP measuring operation(s) based on PSSCH DM-RS sequence(s), which is scheduled by a PSCCH that is successfully decoded by the UE, sidelink RSSI (S-RSSI) measuring operation(s), and/or S-RSSI measuring operation(s) based on subchannel(s) related to V2X resource pool(s). In the various embodiments of the present disclosure, transmitting operation(s) of the UE may include transmitting operation(s) of SL channel(s) and/or SL signal(s) (e.g., PSCCH, PSSCH, PSFCH, PSBCH, PSSS/SSSS, and so on). Transmitting operation(s) may include transmitting operation(s) of WAN UL channel(s) and/or WAN UL signal(s) (e.g., PUSCH, PUCCH, SRS, and so on). In the various embodiments of the present disclosure, a synchronization signal may include an SLSS and/or a PSBCH.

In the various embodiments of the present disclosure, configuration may include signaling, signaling from a network, configuration from a network, and/or a pre-configuration from a network. In the various embodiments of the present disclosure, definition may include signaling, signaling from a network, configuration from a network, and/or a pre-configuration from a network. In the various embodiments of the present disclosure, designation may include signaling, signaling from a network, configuration from a network, and/or a pre-configuration from a network.

In the various embodiments of the present disclosure, ProSe Per Packet Priority (PPPP) may be replaced with ProSe Per Packet Reliability (PPPR), and PPPR may be replaced with PPPP. For example, as the PPPP value becomes smaller, this may indicate a high priority, and, as the PPPP value becomes greater, this may indicate a low priority. For example, as the PPPR value becomes smaller, this may indicate a high reliability, and, as the PPPR value becomes greater, this may indicate a low reliability. For example, a PPPP value related to a service, a packet or a message being related to a high priority may be smaller than a PPPP value related to a service, a packet or a message being related to a low priority. For example, a PPPR value related to a service, a packet or a message being related to a high reliability may be smaller than a PPPR value related to a service, a packet or a message being related to a low reliability.

Meanwhile, in the present disclosure, a high priority may mean a small priority value, and a low priority may mean a large priority value. For example, Table 5 shows an example of priorities.

TABLE 5

| service or logical channel | priority value |
| --- | --- |
| service A or logical channel A | 1 |
| service B or logical channel B | 2 |
| service C or logical channel C | 3 |

Referring to Table 5, for example, service A or logical channel A related to the smallest priority value may have the highest priority. For example, service C or logical channel C related to the largest priority value may have the lowest priority.

In the various embodiments of the present disclosure, a session may include at least one of a unicast session (e.g., a unicast session for SL), a groupcast/multicast session (e.g., a groupcast/multicast session for SL), and/or a broadcast session (e.g., a broadcast session for SL).

In the various embodiments of the present disclosure, a carrier may be replaced with at least one of a BWP and/or a resource pool, or vice versa. For example, a carrier may include at least one of a BWP and/or a resource pool. For example, a carrier may include one or more BWPs. For example, a BWP may include one or more resource pools.

Meanwhile, in the present disclosure, for example, a transmitting UE (TX UE) may be a UE which transmits data to a (target) receiving UE (RX UE). For example, the TX UE may be a UE which performs PSCCH transmission and/or PSSCH transmission. And/or, for example, the TX UE may be a UE which transmits SL CSI-RS(s) and/or a SL CSI report request indicator to the (target) RX UE. And/or, for example, the TX UE may be a UE which transmits a (control) channel (e.g., PSCCH, PSSCH, etc.) and/or reference signal(s) on the (control) channel (e.g., DM-RS, CSI-RS, etc.), to be used for a SL RLM operation and/or a SL RLF operation of the (target) RX UE.

Meanwhile, in the present disclosure, for example, a receiving UE (RX UE) may be a UE which transmits SL HARQ feedback to a transmitting UE (TX UE) based on whether decoding of data received from the TX UE is successful and/or whether detection/decoding of a PSCCH (related to PSSCH scheduling) transmitted by the TX UE is successful. And/or, for example, the RX UE may be a UE which performs SL CSI transmission to the TX UE based on SL CSI-RS(s) and/or a SL CSI report request indicator received from the TX UE. And/or, for example, the RX UE is a UE which transmits a SL (L1) reference signal received power (RSRP) measurement value, to the TX UE, measured based on (pre-defined) reference signal(s) and/or a SL (L1) RSRP report request indicator received from the TX UE. And/or, for example, the RX UE may be a UE which transmits data of the RX UE to the TX UE. And/or, for example, the RX UE may be a UE which performs a SL RLM operation and/or a SL RLF operation based on a (pre-configured) (control) channel and/or reference signal(s) on the (control) channel received from the TX UE.

Meanwhile, in the present disclosure, for example, in case the RX UE transmits SL HARQ feedback information for a PSSCH and/or a PSCCH received from the TX UE, the following options or some of the following options may be considered. Herein, for example, the following options or some of the following options may be limitedly applied only if the RX UE successfully decodes/detects a PSCCH scheduling a PSSCH.

(1) groupcast HARQ feedback option 1: NACK information may be transmitted to the TX UE only if the RX UE fails to decode/receive the PSSCH received from the TX UE.

(2) groupcast HARQ feedback option 2: If the RX UE succeeds in decoding/receiving the PSSCH received from the TX UE, ACK information may be transmitted to the TX UE, and if the RX UE fails to decode/receive the PSSCH, NACK information may be transmitted to the TX UE.

Meanwhile, in the present disclosure, for example, the TX UE may transmit the following information or some of the following information to the RX UE through SCI(s). Herein, for example, the TX UE may transmit some or all of the following information to the RX UE through a first SCI and/or a second SCI.

PSSCH (and/or PSCCH) related resource allocation information (e.g., the location/number of time/frequency resources, resource reservation information (e.g., period))

SL CSI report request indicator or SL (L1) reference signal received power (RSRP) (and/or SL (L1) reference signal received quality (RSRQ) and/or SL (L1) reference signal strength indicator (RSSI)) report request indicator SL CSI transmission indicator (or SL (L1) RSRP (and/or SL (L1) RSRQ and/or SL (L1) RSSI) information transmission indicator) (on a PSSCH)

Modulation and Coding Scheme (MCS) information

TX power information

L1 destination ID information and/or L1 source ID information

SL HARQ process ID information

New Data Indicator (NDI) information

Redundancy Version (RV) information (Transmission traffic/packet related) QoS information (e.g., priority information)

SL CSI-RS transmission indicator or information on the number of antenna ports for (transmitting) SL CSI-RS TX UE location information or location (or distance range) information of the target RX UE (for which SL HARQ feedback is requested)

Reference signal (e.g., DM-RS, etc.) information related to decoding (and/or channel estimation) of data transmitted through a PSSCH. For example, information related to a pattern of (time-frequency) mapping resources of DM-RS(s), RANK information, antenna port index information, information on the number of antenna ports, etc.

Meanwhile, in the present disclosure, for example, since the TX UE may transmit a SCI, a first SCI and/or a second SCI to the RX UE through a PSCCH, the PSCCH may be replaced/substituted with the SCI and/or the first SCI and/or the second SCI. And/or, the SCI may be replaced/substituted with the PSCCH and/or the first SCI and/or the second SCI. And/or, for example, since the TX UE may transmit a second SCI to the RX UE through a PSSCH, the PSSCH may be replaced/substituted with the second SCI.

Meanwhile, in the present disclosure, for example, if SCI configuration fields are divided into two groups in consideration of a (relatively) high SCI payload size, the first SCI including a first SCI configuration field group may be referred to as a 1st SCI, and the second SCI including a second SCI configuration field group may be referred to as a 2nd SCI. Also, for example, the 1st SCI may be transmitted to the receiving UE through a PSCCH. Also, for example, the $2^{nd}$ SCI may be transmitted to the receiving UE through a (independent) PSCCH or may be piggybacked and transmitted together with data through a PSSCH.

Meanwhile, in the present disclosure, for example, the term "configure/configured" or the term "define/defined" may refer to (pre)configuration from a base station or a network (through pre-defined signaling (e.g., SIB, MAC, RRC, etc.)) (for each resource pool).

Meanwhile, in the present disclosure, for example, since an RLF may be determined based on out-of-synch (OOS) indicator(s) or in-synch (IS) indicator(s), the RLF may be replaced/substituted with out-of-synch (OOS) indicator(s) or in-synch (IS) indicator(s).

Meanwhile, in the present disclosure, for example, an RB may be replaced/substituted with a subcarrier. Also, in the present disclosure, for example, a packet or a traffic may be replaced/substituted with a TB or a MAC PDU based on a transmission layer.

Meanwhile, in the present disclosure, a CBG may be replaced/substituted with a TB.

Meanwhile, in the present disclosure, for example, a source ID may be replaced/substituted with a destination ID.

Meanwhile, in the present disclosure, for example, an L1 ID may be replaced/substituted with an L2 ID. For example, the L1 ID may be an L1 source ID or an L1 destination ID. For example, the L2 ID may be an L2 source ID or an L2 destination ID.

Meanwhile, in the present disclosure, for example, an operation of the transmitting UE to reserve/select/determine retransmission resource(s) may include: an operation of the transmitting UE to reserve/select/determine potential retransmission resource(s) for which actual use will be determined based on SL HARQ feedback information received from the receiving UE.

Meanwhile, in the present disclosure, a sub-selection window may be replaced/substituted with a selection window and/or the pre-configured number of resource sets within the selection window, or vice versa.

Meanwhile, in the present disclosure, SL MODE 1 may refer to a resource allocation method or a communication method in which a base station directly schedules SL transmission resource(s) for a TX UE through pre-defined signaling (e.g., DCI or RRC message). For example, SL MODE 2 may refer to a resource allocation method or a communication method in which a UE independently selects SL transmission resource(s) in a resource pool pre-configured or configured from a base station or a network. For example, a UE performing SL communication based on SL MODE 1 may be referred to as a MODE 1 UE or MODE 1 TX UE, and a UE performing SL communication based on SL MODE 2 may be referred to as a MODE 2 UE or MODE 2 TX UE.

Meanwhile, in the present disclosure, for example, a dynamic grant (DG) may be replaced/substituted with a configured grant (CG) and/or a semi-persistent scheduling (SPS) grant, or vice versa. For example, the DG may be replaced/substituted with a combination of the CG and the SPS grant, or vice versa. Or, the CG may be replaced/substituted with a CG type 1 or a CG type 2, or vice versa.

Meanwhile, in the present disclosure, for example, a channel may be replaced/substituted with a signal, or vice versa.

Meanwhile, in the present disclosure, for example, a cast type may be replaced/substituted with at least one of unicast, groupcast, and/or broadcast, or vice versa.

Meanwhile, in the present disclosure, for example, a resource may be replaced/substituted with a slot or a symbol, or vice versa. For example, the resource may include a slot and/or a symbol.

Meanwhile, in the present disclosure, blind retransmission may refer that the TX UE performs retransmission without receiving SL HARQ feedback information from the RX UE. For example, SL HARQ feedback-based retransmission may refer that the TX UE determines whether to perform retransmission based on SL HARQ feedback information received from the RX UE and performs retransmission. Specifically, for example, in case the TX UE perform SL HARQ feedback-based retransmission, if the TX UE receives NACK and/or DTX information from the RX UE, the TX UE may perform retransmission to the RX UE.

Meanwhile, in the present disclosure, time may be replaced/substituted with frequency, or vice versa.

Meanwhile, in the present disclosure, for example, for convenience of description, a (physical) channel used when a RX UE transmits at least one of the following information to a TX UE may be referred to as a PSFCH.

SL HARQ feedback, SL CSI, SL (L1) RSRP

Meanwhile, in NR V2X communication or NR sidelink communication, the transmitting UE may reserve/select one or more transmission resources for sidelink transmission (e.g., initial transmission and/or retransmission), and the transmitting UE may inform the receiving UE of information on the location of the one or more transmission resources.

Meanwhile, when performing sidelink communication, for example, a method for the transmitting UE to reserve or pre-determine a transmission resource for the receiving UE may be based on the embodiments of FIG. 12A, FIG. 12B or FIG. 13 to be described below.

Figure 12A:
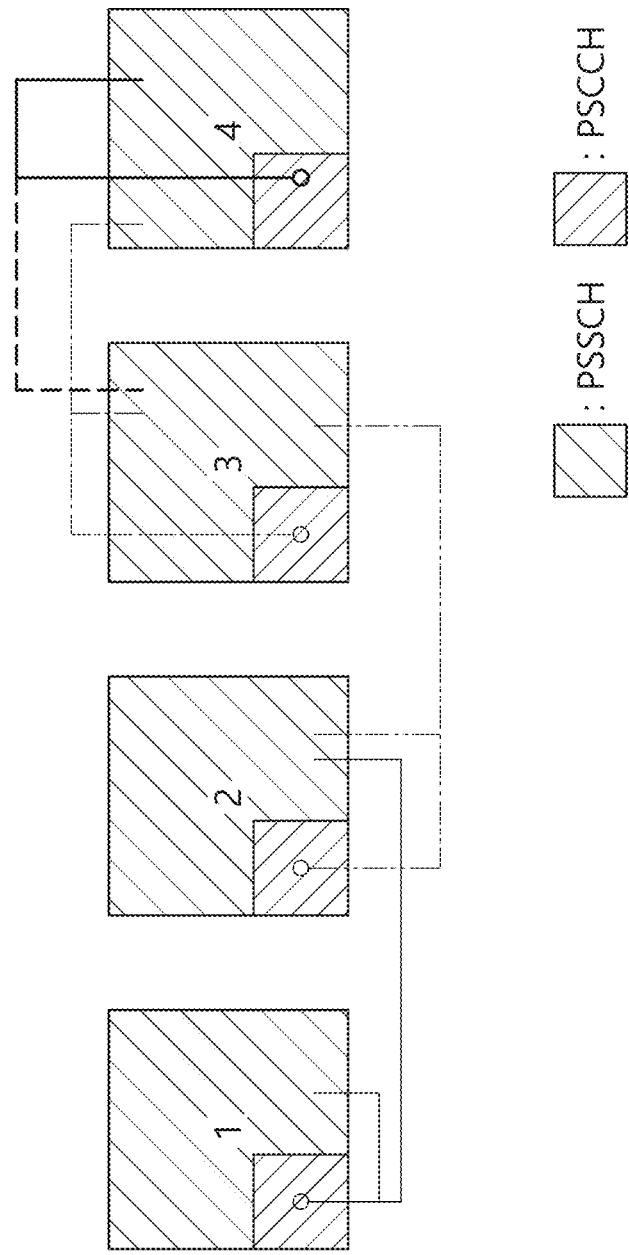
FIGS. 12A and 12B show an example of chain-based resource reservation.
Figure 12B:
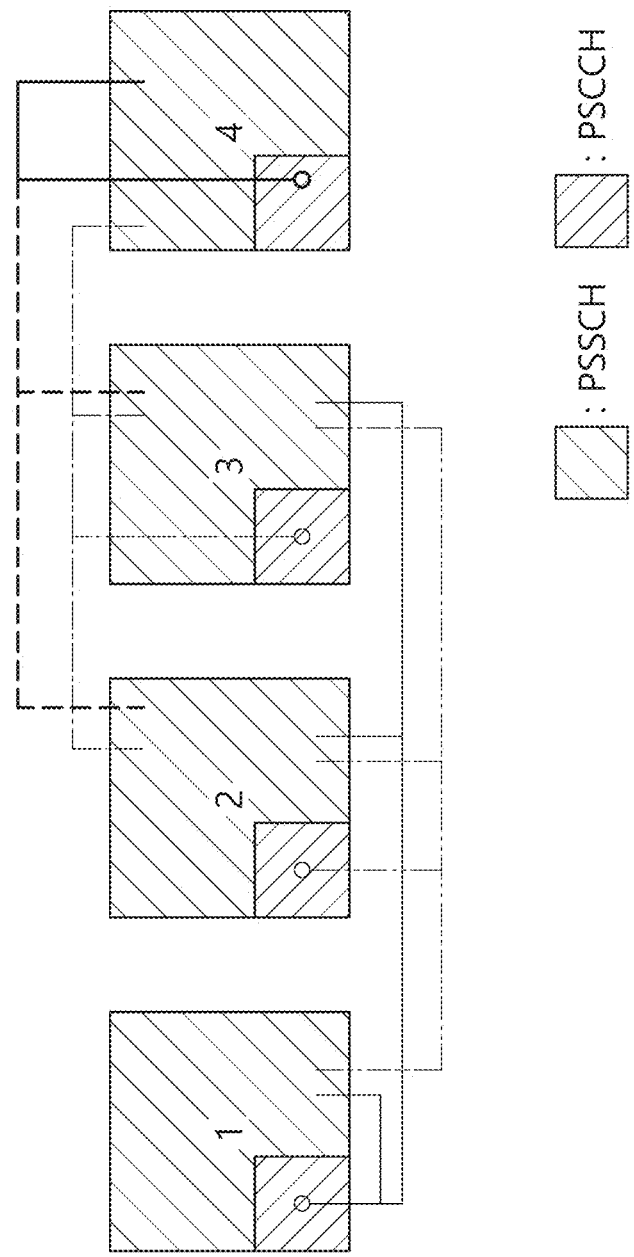

FIGS. 12A and 12B show an example of chain-based resource reservation.

For example, the transmitting UE may perform the reservation of the transmission resources based on CHAIN. Specifically, for example, when the transmitting UE performs reservation of K number of transmission resources, location information of transmission resources less than K may be transmitted or informed to the receiving UE through SCI transmitted to the receiving UE at any (or specific) transmission time point or time resource. That is, for example, the SCI may include location information of transmission resources less than K. Or, for example, when the transmitting UE reserves K number of transmission resources related to a specific TB, location information of transmission resources less than K may be transmitted or informed to the receiving UE through SCI transmitted to the receiving UE at any (or specific) transmission time point or time resource. That is, the SCI may include location information of transmission resources less than K. At this time, for example, the transmitting UE signals only the location information of transmission resources less than K to the receiving UE through one SCI transmitted at any (or specific) transmission time point or time resource, thereby preventing performance degradation due to excessive increase in SCI PAYLOAD. Specifically, for example, FIG. 12A shows a method for the transmitting UE to perform CHAIN-based resource reservation, when the value of K is 4 and the transmitting UE signals location information of (maximum) two transmission resources to the receiving UE through one SCI. Also, for example, FIG. 12B shows a method for the transmitting UE to perform CHAIN-based resource reservation, when the value of K is 4 and the transmitting UE signals location information of (maximum) three transmission resources to the receiving UE through one SCI. For example, in FIGS. 12A and 12B, only location information of the fourth transmission-related resource may be transmitted/signaled to the receiving UE through the fourth (or last) transmission-related PSCCH transmitted by the transmitting UE. And/or, for example, in FIG. 12A, location information of the third transmission-related resource may be additionally transmitted/signaled to the receiving UE through the fourth (or last) transmission-related PSCCH transmitted by the transmitting UE. And/or, for example, in FIG. 12B, location information of the second transmission and the third transmission-related resource may be additionally transmitted/signaling to the receiving UE through the fourth (or last) transmission-related PSCCH transmitted by the transmitting UE. At this time, for example, when only location information of the fourth transmission-related resource is transmitted/signaled to the receiving UE through the fourth (or last) transmission-related PSCCH transmitted by the transmitting UE in FIGS. 12A and 12B, the transmitting UE may configured or designate a location information field/bit of an unused or remaining transmission resource to a pre-configured value (e.g., 0). Or, for example, when only location information of the fourth transmission-related resource is transmitted/signaled to the receiving UE through the fourth (or last) transmission-related PSCCH transmitted by the transmitting UE in FIGS. 12A and 12B, the transmitting UE may configure or designate a location information field/bit of an unused or remaining transmission resource to indicate a pre-configured status/bit value indicating that it is the last transmission (among the four transmissions).

Figure 13:
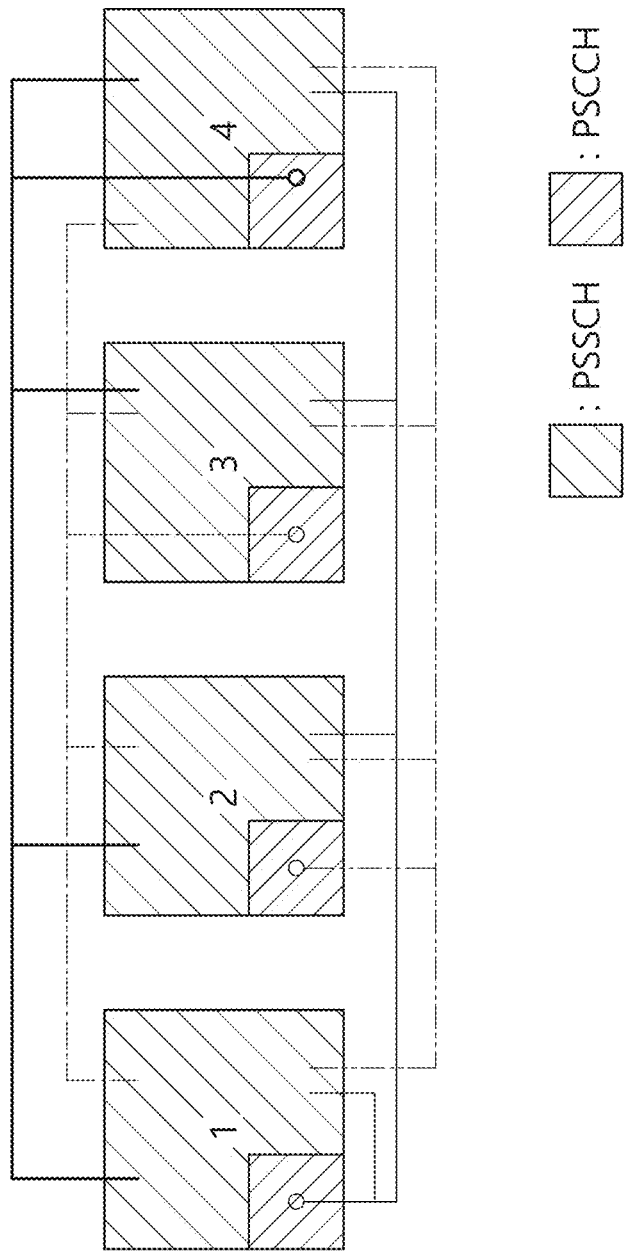
FIG. 13 shows an example of block-based resource reservation.

FIG. 13 shows an example of block-based resource reservation.

For example, the transmitting UE may perform the reservation of the transmission resources based on BLOCK. Specifically, for example, when the transmitting UE performs reservation of K number of transmission resources, all location information related to the K number of transmission resources may be transmitted or informed to the receiving UE through SCI transmitted to the receiving UE at any (or specific) transmission time point or time resource. That is, the SCI may include location information of the K number of transmission resources. Or, for example, when the transmitting UE performs reservation of K number of transmission resources related to a specific TB, all location information related to the K number of transmission resources may be transmitted or informed to the receiving UE through SCI transmitted to the receiving UE at any (or specific) transmission time point or time resource. That is, the SCI may include location information of the K number of transmission resources. For example, FIG. 13 shows a method for the transmitting UE to perform BLOCK-based resource reservation by signaling location information of four transmission resources to the receiving UE through one SCI, when the value of K is 4.

Figure 14:
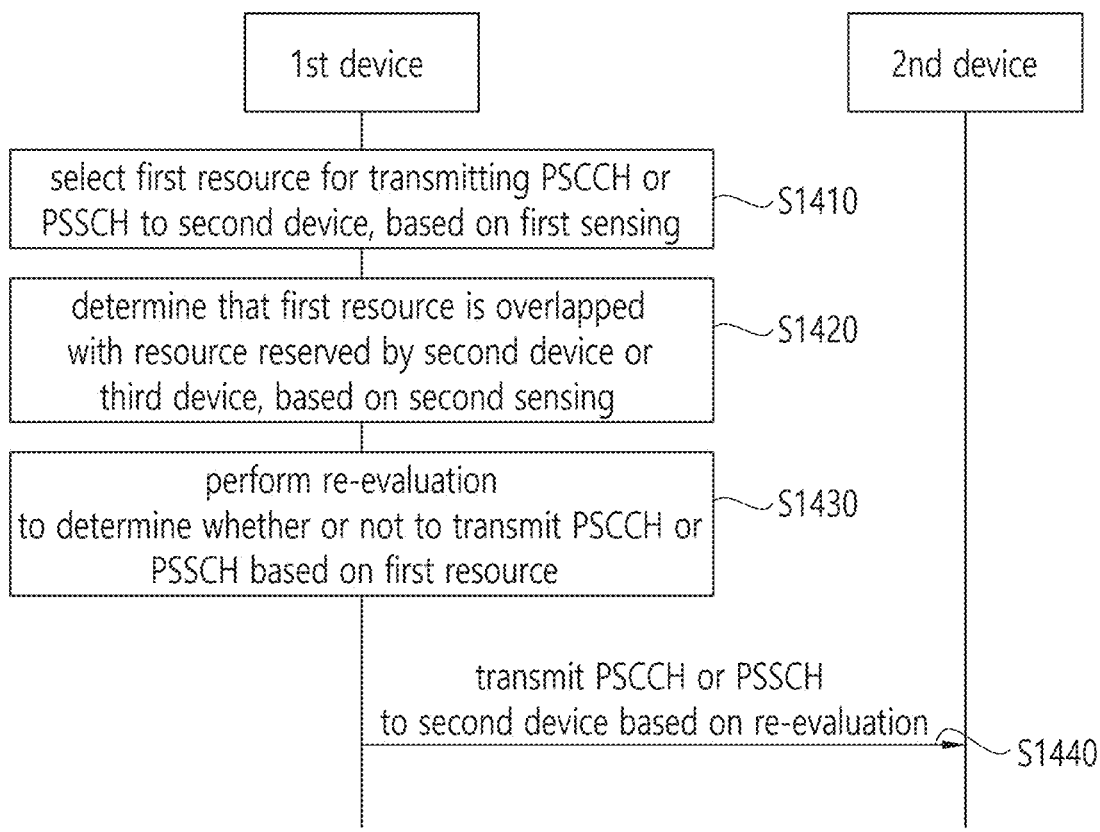
FIG. 14 shows a method for a first device to determine a sidelink resource based on a sensing, based on an embodiment of the present disclosure.

FIG. 14 shows a method for a first device to determine a sidelink resource based on a sensing, based on an embodiment of the present disclosure.

In one embodiment, the first device shown in the flowchart of FIG. 14 may correspond to the first device of FIGS. 15 and 16 to be described later, and the second device shown in the flowchart of FIG. 14 may correspond to the second device of FIGS. 15 and 16 to be described later.

In step S1410, the first device according to an embodiment may select a first resource for transmitting a physical sidelink control channel (PSCCH) or a physical sidelink shared channel (PSSCH) to the second device, based on a first sensing. In step S1420, the first device according to an embodiment may determine that the first resource is overlapped with a resource reserved by the second device or the third device, based on a second sensing. In step S1430, the first device according to an embodiment may perform re-evaluation to determine whether or not to transmit the PSCCH or the PSSCH based on the first resource. In step S1440, the first device according to an embodiment may transmit the PSCCH or the PSSCH to the second device based on the re-evaluation. In an embodiment, the end time of the second sensing may be related to a slot related to the first resource, a pre-configured first offset, and a pre-configured second offset. In an embodiment, a first time determined based on a time before the first offset from the first slot may represents a time related to the re-evaluation. In an embodiment, a second time before the second offset from the first time may be related to the end time of the second sensing.

Hereinafter, various embodiments and examples directly or indirectly related to at least one of steps S1410 to S1440 will be described.

Meanwhile, based on an embodiment of the present disclosure, the UE may perform a sensing operation (hereinafter referred to as INI_SENS) and reserve a (potential) transmission resource for performing transmission based on the INI_SENS. In this case, if a plurality of different UEs perform a reservation for transmission resources, overlap may occur between the transmission resources of the plurality of UEs. To solve this, for example, the UE may perform an additional sensing operation (ADD_SENS) until a time corresponding to the resource reserved by the UE. For example, the UE may perform ADD_SENS based on a pre-configured time window length until a time corresponding to the resource reserved by the UE. Herein, for example, the resource reserved by the UE may be an initial transmission resource or the 1st transmission resource. Or, for example, if the UE reserves a plurality of transmission resources, the resource reserved by the UE may be each of resources included in the plurality of transmission resources.

For example, after the UE performs ADD_SENS, if the UE finds out that an overlap has occurred between all or part of the resource previously reserved by the UE and a transmission/reservation resource of other UEs, or if the UE determines/decides that an overlap has occurred between all or part of the previously reserved resource and a transmission/reservation resource of other UEs, the UE may perform reselection for the previously reserved transmission resource. In this case, for example, the reselection operation of the UE may be an operation of selecting/determining a transmission resource different from the transmission resource previously reserved by the UE. For example, the resource previously reserved by the UE may be a resource reserved based on INI_SENS. For example, the reselection for the previously reserved transmission resource may be performed for a transmission resource corresponding to an area overlapping with the transmission/reservation resource of other UEs, or may be performed for the entire reserved transmission resource.

Meanwhile, in the case of performing the re-evaluation operation, as described above, after the UE selects a transmission resource (slot N) based on a result of the initial sensing (INI_SNS) and before the UE signals information related to the transmission resource through a SCI, an additional sensing (ADD_SNS) operation/result may be required to check whether or not the selected transmission resource is overlapped with a transmission resource of other UEs. In terms of performance improvement, it would be better if the interval (T_OFFSET) between the end of ADD_SNS and the slot N is as short as possible, but there is a problem in that the smaller the T_OFFSET value, the faster the UE has to process ADD_SNS result processing/transmission resource reselection, etc. may occur (i.e., UE implementation complexity is increased). Therefore, it is necessary to rationally define the end time of ADD_SNS of the re-evaluation target resource in consideration of the UE implementation complexity.

Meanwhile, based on an embodiment of the present disclosure, when the UE performs the operation according to the embodiment, the UE may perform/apply at least one of the following proposed methods or rules. For example, whether the following proposed method/rule is applied or not may be configured or determined differently (or limitedly) based on at least one of a resource pool configured for the UE, a type of a service related to transmission of the UE, a priority of a service, a cast type performed by the UE, a destination UE, a (L1 or L2) destination (or source) ID, a service QoS parameter/requirement (e.g. reliability, latency), a (resource pool) congestion level, and/or a SL mode (e.g., mode 1, mode 2). And/or, for example, whether the following proposed method/rule is applied or not may be configured or determined differently (or limitedly) based on at least one of a chain-based resource reservation operation, a block-based resource reservation operation, a blind retransmission operation, a SL HARQ feedback-based retransmission operation, a configured grant-based resource selection/reservation/determination operation, and/or a dynamic grant-based resource selection/reservation/determination operation. And/or, for example, the parameter(s) (e.g., threshold) related to the following proposed method/rule may be configured or determined differently (or limitedly) based on at least one of a resource pool configured for the UE, a type of a service related to transmission of the UE, a priority of a service, a cast type performed by the UE, a destination UE, a (L1 or L2) destination (or source) ID, a service QoS parameter/requirement (e.g. reliability, latency), a (resource pool) congestion level, and/or a SL mode (e.g., mode 1, mode 2). And/or, for example, the parameter(s) (e.g., threshold) related to the following proposed method/rule may be configured or determined differently (or limitedly) based on at least one of a chain-based resource reservation operation, a block-based resource reservation operation, a blind retransmission operation, a SL HARQ feedback-based retransmission operation, a configured grant-based resource selection/reservation/determination operation, and/or a dynamic grant-based resource selection/reservation/determination operation.

For example, if a time corresponding to a resource previously reserved/selected by the UE based on INI_SENS is SLOT #N, the ending time of ADD_SENS performed by the UE may be configured/determined/defined as a time before a pre-configured offset from a time SLOT #K (e.g., K≤N) when reservation information related to the previously reserved/selected resource is signaled. That is, if the time corresponding to the resource previously reserved/selected by the UE based on INI_SENS is SLOT #N, the UE may perform ADD_SENS until a time before a pre-configured offset from a time SLOT #K (e.g., K≤N) when reservation information related to the previously reserved/selected resource is signaled. In this case, for example, if the UE signals reservation information related to the previously reserved/selected resource in SLOT #K, the ending time of ADD_SENS performed by the UE may be configured/determined/defined as SLOT #(K−1). Or, for example, if the UE signals reservation information related to the previously reserved/selected resource in SLOT #K, the ending time of ADD_SENS performed by the UE may be configured/determined/defined as SLOT #(K−P). That is, if the UE signals reservation information related to the previously reserved/selected resource in SLOT #K, the UE may perform ADD_SENS until SLOT #(K−1) or SLOT #(K−P). In this case, for example, the P value may be a (minimum) time required for the UE to process sensing information. For example, the reservation information related to the previously reserved/selected resource may be signaled to other UEs through a PSCCH and/or a PSSCH transmitted by the UE.

For example, a threshold of PSSCH (and/or PSCCH) RSRP related to ADD_SENS performed by the UE may be configured differently from (or independently of) a threshold of PSSCH (and/or PSCCH) RSRP related to INI_SENS performed by the UE. In this case, the threshold of PSSCH (and/or PSCCH) RSRP related to ADD_SENS may be used by the UE for excluding resource(s) occupied by other adjacent UEs. And/or, for example, the (minimum) ratio/ number of selectable candidate resources to be secured after the UE performs a resource exclusion operation based on the sensing operation may be configured differently (or independently) between ADD_SENS and INI_SENS.

For example, to reduce the probability of a transmission resource collision between different UEs, after performing (potential) resource reservation (to be used for transmission) based on a sensing operation (INI_SENS), the UE may perform an additional sensing operation (ADD_SENS) (according to the pre-configured length of a time window) until the relevant (initial/first or each) reservation resource time. Here, for example, after ADD_SENS, if an overlap between the (INI_SENS-based) reserved (some) resources and transmission/reserved resources of another UE is identified, (overlapping or all) (INI_SENS-based) reserved resources may be reselected.

For example, when the foregoing operation is applied, the UE may apply the following (some) rules. For example, whether the following (some) proposed rules are applied (and/or a parameter (e.g., a threshold value)) may be specifically or differently (or limitedly) configured for a chain (and/or block)-based resource reservation operation (and/or blind (and/or SL HARQ feedback-based) retransmission operation and/or configured grant (and/or dynamic grant)-based resource selection/reservation operation and/or resource pool and/or service type/kind and/or service priority and/or cast type and/or destination UE and/or (L1 or L2) destination(/source) ID and/or (service) QoS parameters (e.g. reliability and latency) and/or (resource pool) congestion level and/or mode type).

For example, assuming that the time of a resource selected based on INI_SENS is "SLOT #N", the ending time of related ADD_SENS may be set to a time that is by a pre-configured offset ahead of a time SLOT #K (e.g., K≤N) at which the corresponding resource-related reservation information is signaled. Here, for example, when information on the INI_SENS-based reserved resource on SLOT #N (or information on re-evaluation) is signaled (through a PSCCH and/or a PSSCH) on SLOT #K, the ending time of related ADD_SENS may be set to SLOT #(K−1) (or SLOT #(K−P) (where P may be interpreted as the (minimum) time required for processing sensing information)) or earlier time.

In another example, the first device according to an embodiment may select a first resource for transmitting a physical sidelink control channel (PSCCH) or a physical sidelink shared channel (PSSCH) to the second device based on INI_SENS. The first device may determine, based on ADD_SENS, that the first resource is overlapped with a resource reserved by the second device or the third device. The first device may perform re-evaluation to determine whether or not to transmit the PSCCH or the PSSCH based on the first resource. The first device may transmit the PSCCH or the PSSCH to the second device based on the re-evaluation. The end time of ADD_SENS may be related to a slot related to the first resource, a pre-configured first offset, and a pre-configured second offset. A first time determined based on a time before the first offset from the first slot may represent a time related to the re-evaluation. A second time before the second offset from the first time may be related to the end time of the second sensing.

For example, an ADD_SENS-related PSSCH (and/or PSCCH) RSRP threshold value (e.g., for the purpose of excluding resources occupied by other adjacent UEs) (and/ or the (minimum) ratio/number of selectable candidate resources to be secured after the sensing-based resource exclusion operation) may be configured to be different from (or independent of) INI_SENS.

Figure 15:
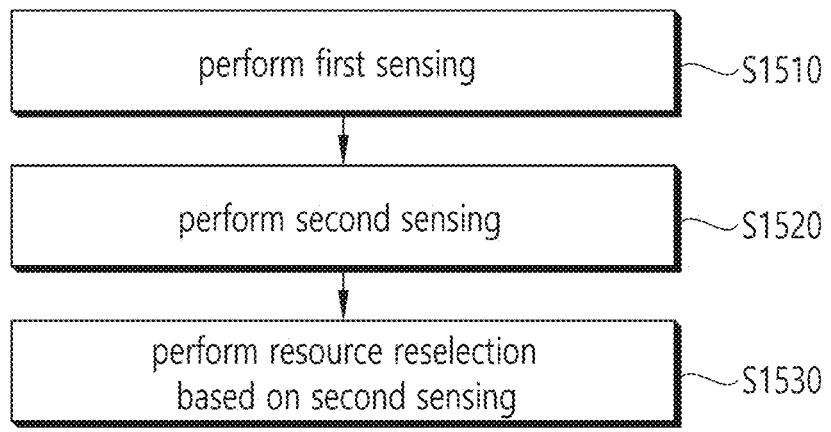
FIG. 15 shows a method for a first device to perform sidelink communication, based on an embodiment of the present disclosure.

FIG. 15 shows a method for a first device to perform sidelink communication, based on an embodiment of the present disclosure.

The embodiment of FIG. 15 may be combined with various methods and/or procedures proposed based on various embodiments of the present disclosure.

Referring to FIG. 15, in step S1510, the first device may perform a first sensing. Based on various embodiments of the present disclosure, the first device may perform the first sensing.

In step S1520, the first device may perform a second sensing. For example, after performing the first sensing, the first device may additionally perform the second sensing until the reserved resource time. For example, based on various embodiments of the present disclosure, the first device may perform the second sensing.

In step S1530, the first device may perform resource reselection based on the second sensing. For example, if some or all of the resources reserved by the first sensing partially or entirely overlap with a resource reserved by other UEs, the first device may perform resource reselection based on the second sensing. For example, based on various embodiments of the present disclosure, the first device may perform resource reselection based on the second sensing.

Figure 16:
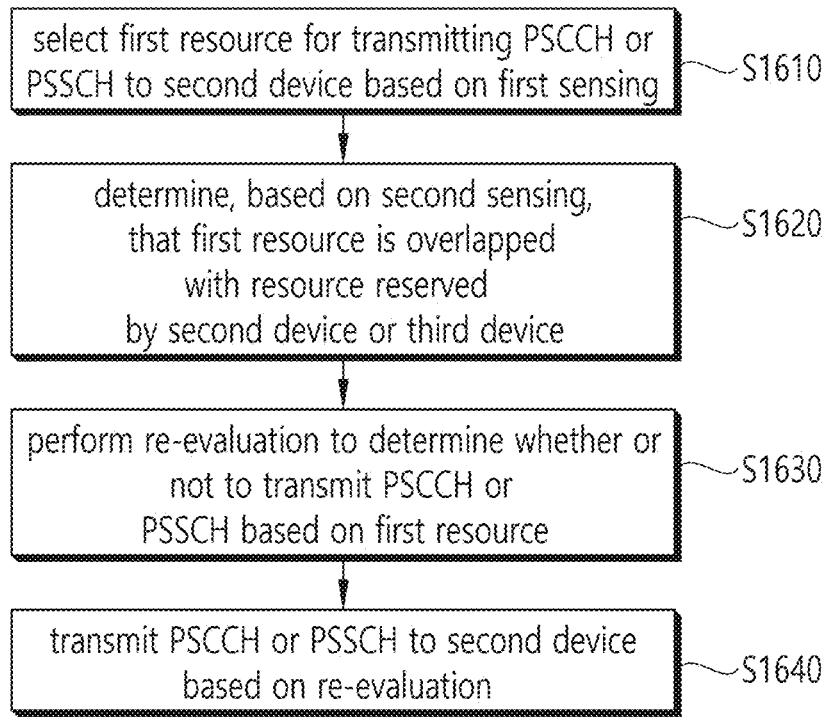
FIG. 16 shows operations of a first device, based on an embodiment of the present disclosure.

FIG. 16 shows operations of a first device, based on an embodiment of the present disclosure.

The operations disclosed in the flowchart of FIG. 16 may be performed in combination with various embodiments of the present disclosure. For example, the operations disclosed in the flowchart of FIG. 16 may be performed based on at least one of devices illustrated in FIGS. 18 to 23. For example, the first device of FIG. 16 may be the first wireless device 100 of FIG. 19 to be described later. In another example, the first device of FIG. 16 may be the second wireless device 200 of FIG. 19 to be described later.

In step S1610, the first device according to an embodiment may select a first resource for transmitting a physical sidelink control channel (PSCCH) or a physical sidelink shared channel (PSSCH) to the second device based on a first sensing.

In step S1620, the first device according to an embodiment may determine, based on a second sensing, that the first resource is overlapped with a resource reserved by the second device or the third device.

In step S1630, the first device according to an embodiment may perform re-evaluation to determine whether or not to transmit the PSCCH or the PSSCH based on the first resource.

In step S1640, the first device according to an embodiment may transmit the PSCCH or the PSSCH to the second device based on the re-evaluation.

In an embodiment, the end time of the second sensing may be related to a slot related to the first resource, a pre-configured first offset, and a pre-configured second offset.

In an embodiment, a first time determined based on a time before the first offset from the first slot may represent a time related to the re-evaluation.

In an embodiment, a second time before the second offset from the first time may be related to the end time of the second sensing.

In an embodiment, the second offset may represent a minimum time required for processing of information related to the sensing.

In an embodiment, the first sensing may be performed within a first sensing window, and the second sensing may be performed within a second sensing window.

In an embodiment, the first sensing window may precede the second sensing window on the time domain.

In an embodiment, the end time of the second sensing may represent the end time of the second sensing window.

In an embodiment, the slot related to the first resource may be included in a time resource duration determined based on a packet delay budget and a time when the first resource is selected.

In an embodiment, the transmitting the PSCCH or the PSSCH to the second device may comprise: excluding the first resource from a resource group for transmitting the PSCCH or the PSSCH based on the re-evaluation.

In an embodiment, the transmitting the PSCCH or the PSSCH to the second device may comprise: based on the re-evaluation, determining not to exclude the first resource from the resource group for transmitting the PSCCH or the PSSCH and transmitting the PSCCH or the PSSCH to the second device based on the first resource.

In an embodiment, at least one of the first offset and the second offset may be determined based on at least one of a resource reservation operation type, a resource configuration method type, a retransmission method type, a resource pool, a service type, a service priority, a cast type, a destination ID, a source ID, a QoS parameter, a congestion level, or a mode type.

In an embodiment, a PSSCH reference signal received power (RSRP) threshold related to the second sensing may be different from a PSSCH RSRP threshold related to the first sensing.

Based on an embodiment of the present disclosure, a first device configured to perform sidelink (SL) communication may be provided. The first device may comprise: at least one memory storing instructions; at least one transceiver; and at least one processor connected to the at least one memory and the at least one transceiver. The at least one processor may execute the instructions to: select a first resource for transmitting a physical sidelink control channel (PSCCH) or a physical sidelink shared channel (PSSCH) to a second device, based on a first sensing; determine that the first resource is overlapped with a resource reserved by the second device or a third device, based on a second sensing; perform re-evaluation to determine whether or not to transmit the PSCCH or the PSSCH based on the first resource; and control the at least one transceiver to transmit, to the second device, the PSCCH or the PSSCH based on the re-evaluation, wherein an end time of the second sensing is related to a slot related to the first resource, a pre-configured first offset and a pre-configured second offset, wherein a first time which is determined based on a time before the first offset from the first slot represents a time related to the re-evaluation, and wherein a second time before the second offset from the first time is related to the end time of the second sensing.

Based on an embodiment of the present disclosure, an apparatus (or chip (set)) configured to control a first user equipment (UE) may be provided. The apparatus may comprise: at least one processor; and at least one memory connected to the at least one processor and storing instructions. The at least one processor may execute the instructions to: select a first resource for transmitting a physical sidelink control channel (PSCCH) or a physical sidelink shared channel (PSSCH) to a second UE, based on a first sensing; determine that the first resource is overlapped with a resource reserved by the second UE or a third UE, based on a second sensing; perform re-evaluation to determine whether or not to transmit the PSCCH or the PSSCH based on the first resource; and transmit, to the second UE, the PSCCH or the PSSCH based on the re-evaluation, wherein an end time of the second sensing is related to a slot related to the first resource, a pre-configured first offset and a pre-configured second offset, wherein a first time which is determined based on a time before the first offset from the first slot represents a time related to the re-evaluation, and wherein a second time before the second offset from the first time is related to the end time of the second sensing.

For example, the first UE of the embodiment may refer to the first device described in the present disclosure. For example, each of the at least one processor and the at least one memory in the apparatus configured to control the first UE may be implemented as a separate sub-chip, or at least two or more components may be implemented through one sub-chip.

Based on an embodiment of the present disclosure, a non-transitory computer-readable storage medium storing instructions may be provided. The instructions, when executed, may cause a first device to: select a first resource for transmitting a physical sidelink control channel (PSCCH) or a physical sidelink shared channel (PSSCH) to a second device, based on a first sensing; determine that the first resource is overlapped with a resource reserved by the second device or a third device, based on a second sensing; perform re-evaluation to determine whether or not to transmit the PSCCH or the PSSCH based on the first resource; and transmit, to the second device, the PSCCH or the PSSCH based on the re-evaluation, wherein an end time of the second sensing is related to a slot related to the first resource, a pre-configured first offset and a pre-configured second offset, wherein a first time which is determined based on a time before the first offset from the first slot represents a time related to the re-evaluation, and wherein a second time before the second offset from the first time is related to the end time of the second sensing.

Figure 17:
FIG. 17 shows operations of a second device, based on an embodiment of the present disclosure.
Figure 17:

FIG. 17 shows operations of a second device, based on an embodiment of the present disclosure.

The operations disclosed in the flowchart of FIG. 17 may be performed in combination with various embodiments of the present disclosure. For example, the operations disclosed in the flowchart of FIG. 17 may be performed based on at least one of devices illustrated in FIGS. 18 to 23. For example, the second device of FIG. 17 may be the second wireless device 200 of FIG. 19 to be described later. In another example, the second device of FIG. 17 may be the first wireless device 100 of FIG. 19 to be described later.

In step S1710, the second device according to an embodiment may receive a PSCCH or a PSSCH from the first device.

In an embodiment, based on a first sensing by the first device, a first resource for transmission of the PSCCH or the PSSCH may be selected.

In an embodiment, based on a second sensing by the first device, it may be determined that the first resource is overlapped with a resource reserved by the second device or the third device.

In an embodiment, re-evaluation may be performed by the first device to determine whether or not to transmit the PSCCH or the PSSCH based on the first resource.

In an embodiment, based on the re-evaluation by the first device, the PSCCH or the PSSCH may be transmitted from the first device to the second device.

In an embodiment, the end time of the second sensing may be related to a slot related to the first resource, a pre-configured first offset, and a pre-configured second offset.

In an embodiment, a first time which is determined based on a time before the first offset from the first slot may represent a time related to the re-evaluation.

In an embodiment, a second time before the second offset from the first time may be related to the end time of the second sensing.

In an embodiment, the second offset may represent a minimum time required for processing of information related to the sensing.

In an embodiment, the first sensing may be performed within a first sensing window, and the second sensing may be performed within a second sensing window.

In an embodiment, the first sensing window may precede the second sensing window on the time domain.

In an embodiment, the end time of the second sensing may represent the end time of the second sensing window.

In an embodiment, the slot related to the first resource may be included in a time resource duration determined based on a packet delay budget and a time when the first resource is selected.

In an embodiment, the transmitting the PSCCH or the PSSCH to the second device may comprise: excluding the first resource from a resource group for transmitting the PSCCH or the PSSCH based on the re-evaluation.

In an embodiment, the transmitting the PSCCH or the PSSCH to the second device may comprise: based on the re-evaluation, determining not to exclude the first resource from the resource group for transmitting the PSCCH or the PSSCH and transmitting the PSCCH or the PSSCH to the second device based on the first resource.

In an embodiment, at least one of the first offset and the second offset may be determined based on at least one of a resource reservation operation type, a resource configuration method type, a retransmission method type, a resource pool, a service type, a service priority, a cast type, a destination ID, a source ID, a QoS parameter, a congestion level, or a mode type.

In an embodiment, a PSSCH reference signal received power (RSRP) threshold related to the second sensing may be different from a PSSCH RSRP threshold related to the first sensing.

Based on an embodiment of the present disclosure, a second device configured to perform sidelink (SL) communication may be provided. The second device may comprise: at least one memory storing instructions; at least one transceiver; and at least one processor connected to the at least one memory and the at least one transceiver. The at least one processor may execute the instructions to: control at least one transceiver to receive a PSCCH or a PSSCH from a first device, wherein, based on a first sensing by the first device, a first resource for transmission of the PSCCH or the PSSCH is selected, wherein, based on a second sensing by the first device, it is determined that the first resource is overlapped with a resource reserved by the second device or a third device, wherein re-evaluation is performed by the first device to determine whether or not to transmit the PSCCH or the PSSCH based on the first resource, wherein, based on the re-evaluation by the first device, the PSCCH or the PSSCH is transmitted from the first device to the second device, wherein an end time of the second sensing is related to a slot related to the first resource, a pre-configured first offset and a pre-configured second offset, wherein a first time which is determined based on a time before the first offset from the first slot represents a time related to the re-evaluation, and wherein a second time before the second offset from the first time is related to the end time of the second sensing.

Various embodiments of the present disclosure may be independently implemented. Alternatively, the various embodiments of the present disclosure may be implemented by being combined or merged. For example, although the various embodiments of the present disclosure have been described based on the 3GPP LTE system for convenience of explanation, the various embodiments of the present disclosure may also be extendedly applied to another system other than the 3GPP LTE system. For example, the various embodiments of the present disclosure may also be used in an uplink or downlink case without being limited only to direct communication between UEs. In this case, a base station, a relay node, or the like may use the proposed method according to various embodiments of the present disclosure. For example, it may be defined that information on whether to apply the method according to various embodiments of the present disclosure is reported by the base station to the UE or by a transmitting UE to a receiving UE through pre-defined signaling (e.g., physical layer signaling or higher layer signaling). For example, it may be defined that information on a rule according to various embodiments of the present disclosure is reported by the base station to the UE or by a transmitting UE to a receiving UE through pre-defined signaling (e.g., physical layer signaling or higher layer signaling). For example, some embodiments among various embodiments of the present disclosure may be applied limitedly only to a resource allocation mode 1. For example, some embodiments among various embodiments of the present disclosure may be applied limitedly only to a resource allocation mode 2.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 18:
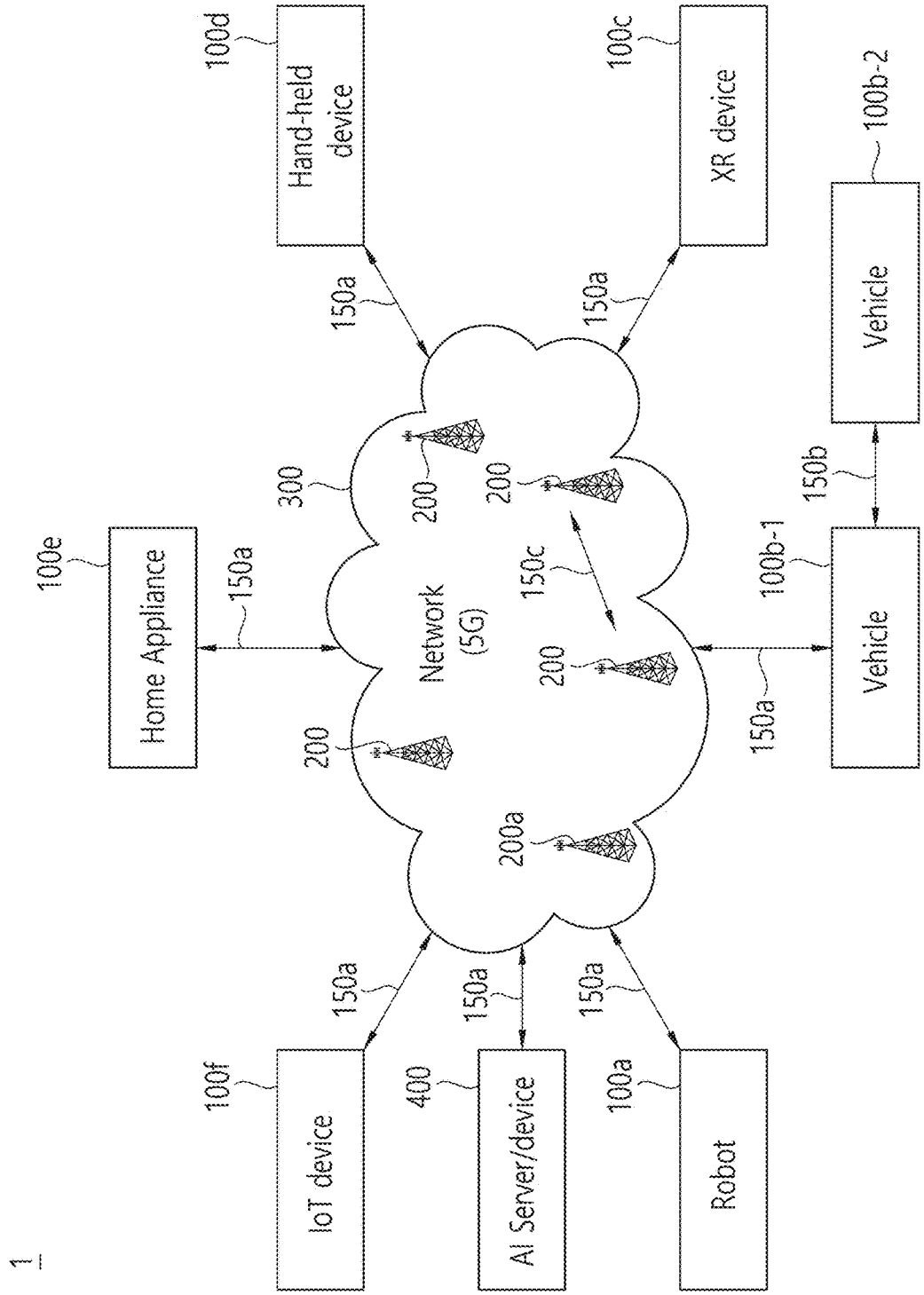
FIG. 18 shows a communication system 1, based on an embodiment of the present disclosure.

FIG. 18 shows a communication system 1, based on an embodiment of the present disclosure.

Referring to FIG. 18, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Herein, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 19:
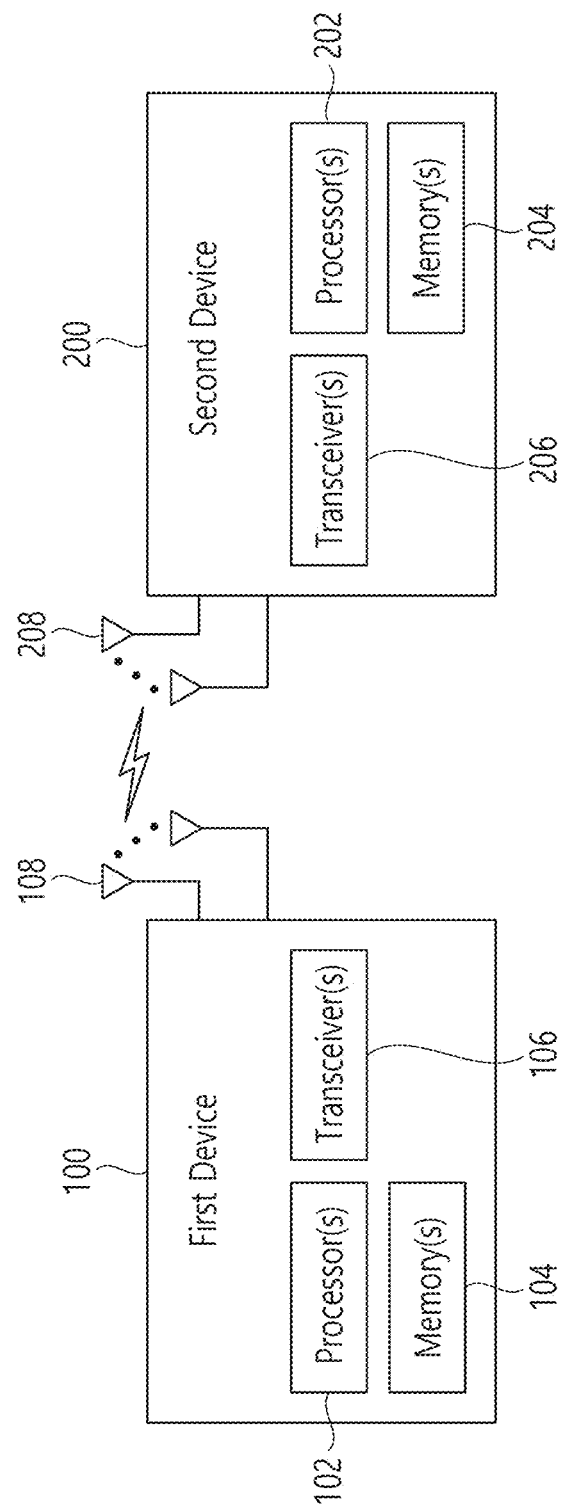
FIG. 19 shows wireless devices, based on an embodiment of the present disclosure.

FIG. 19 shows wireless devices, based on an embodiment of the present disclosure.

Referring to FIG. 19, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s)

202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 20:
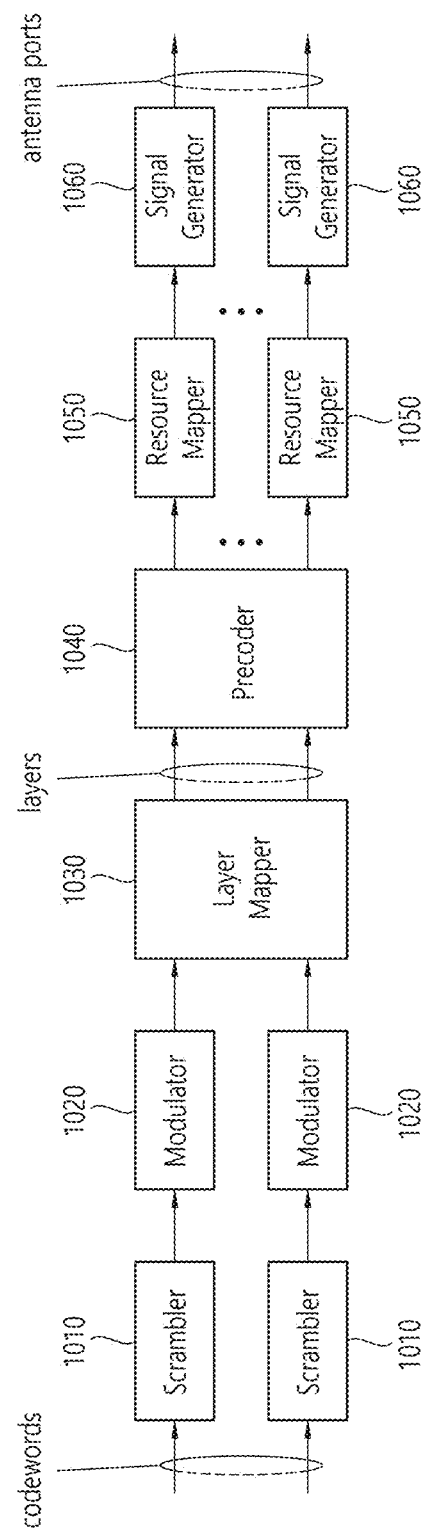
FIG. 20 shows a signal process circuit for a transmission signal, based on an embodiment of the present disclosure.

FIG. 20 shows a signal process circuit for a transmission signal, based on an embodiment of the present disclosure.

Referring to FIG. 20, a signal processing circuit 1000 may include scramblers 1010, modulators 1020, a layer mapper 1030, a precoder 1040, resource mappers 1050, and signal generators 1060. An operation/function of FIG. 20 may be performed, without being limited to, the processors 102 and 202 and/or the transceivers 106 and 206 of FIG. 19. Hardware elements of FIG. 20 may be implemented by the processors 102 and 202 and/or the transceivers 106 and 206 of FIG. 19. For example, blocks 1010 to 1060 may be implemented by the processors 102 and 202 of FIG. 19. Alternatively, the blocks 1010 to 1050 may be implemented by the processors 102 and 202 of FIG. 19 and the block 1060 may be implemented by the transceivers 106 and 206 of FIG. 19.

Codewords may be converted into radio signals via the signal processing circuit 1000 of FIG. 20. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 20. For example, the wireless devices (e.g., 100 and 200 of FIG. 19) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 21:
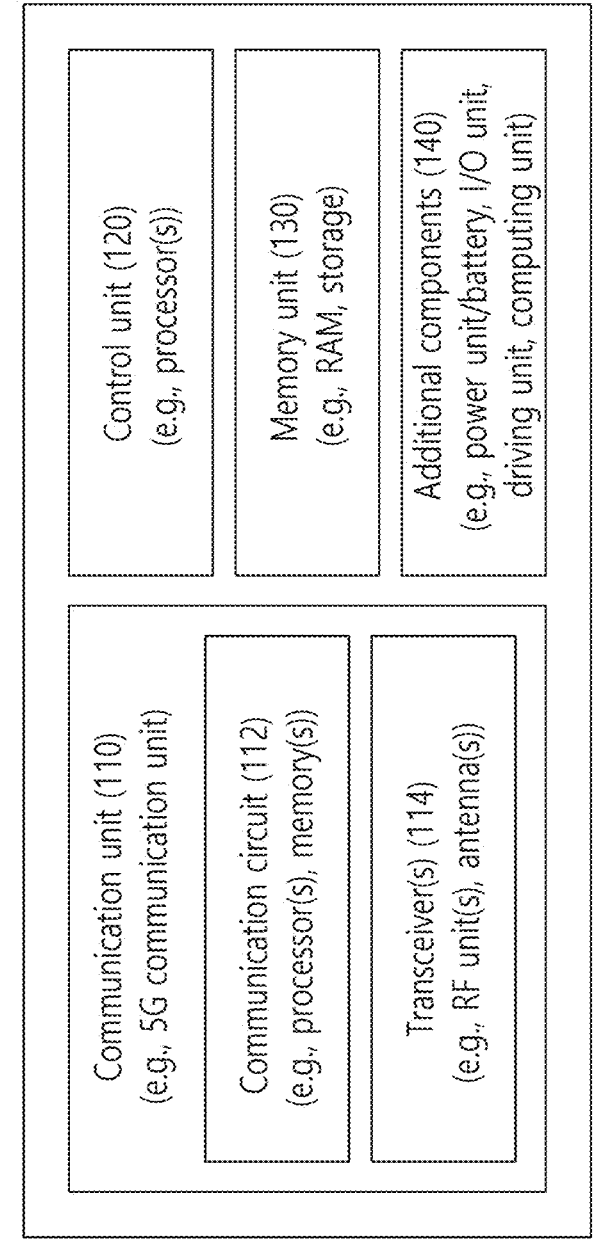
FIG. 21 shows another example of a wireless device, based on an embodiment of the present disclosure.

FIG. 21 shows another example of a wireless device, based on an embodiment of the present disclosure. The wireless device may be implemented in various forms according to a use-case/service (refer to FIG. 18).

Referring to FIG. 21, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 18), the vehicles (100b-1 and 100b-2 of FIG. 18), the XR device (100c of FIG. 18), the hand-held device (100d of FIG. 18), the home appliance (100e of FIG. 18), the IoT device (100f of FIG. 18), a digital broadcast terminal, a hologram device, a public safety device, an MTC device, a medicine device, a fintech device (or a finance device), a security device, a climate/environment device, the AI server/device (400 of FIG. 18), the BSs (200 of FIG. 18), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 21 will be described in detail with reference to the drawings.

Figure 22:
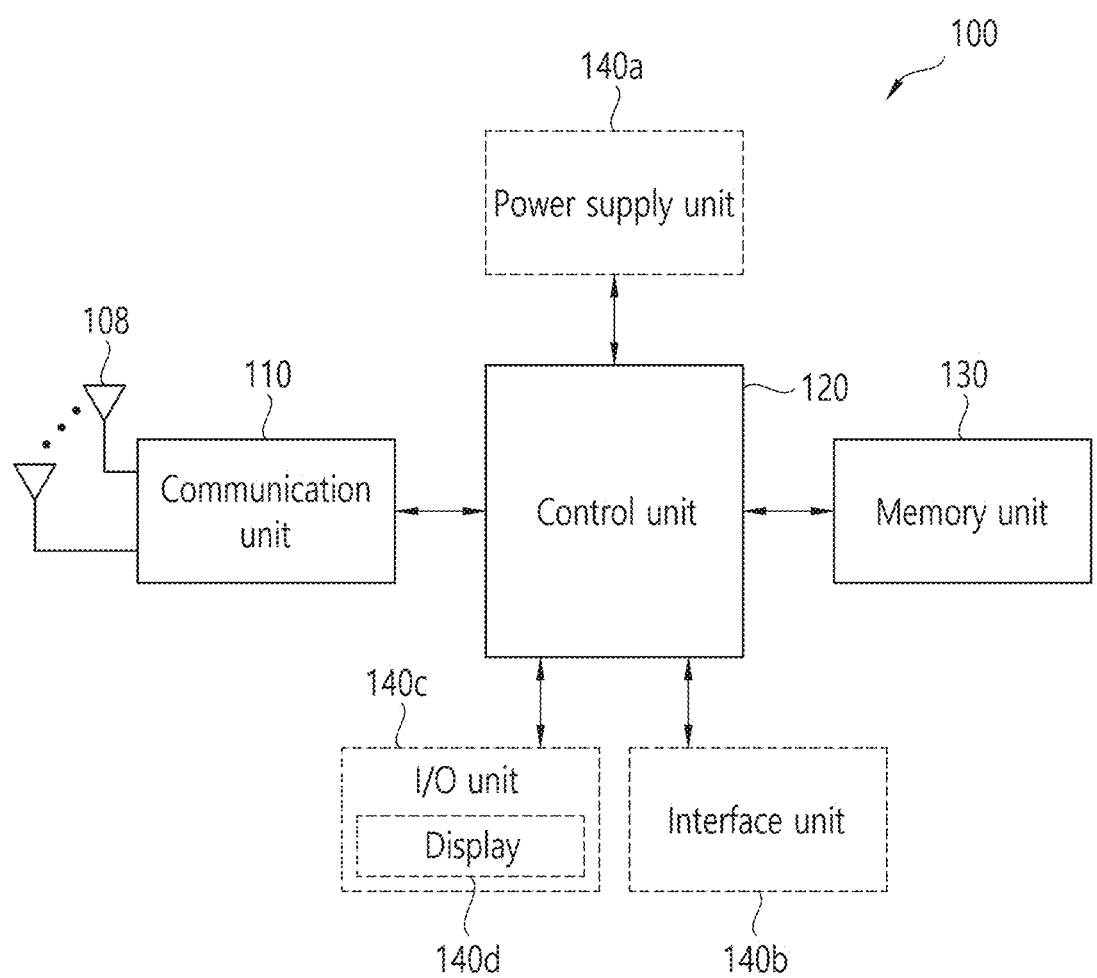
FIG. 22 shows a hand-held device, based on an embodiment of the present disclosure.

FIG. 22 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 22, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 21, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 23:
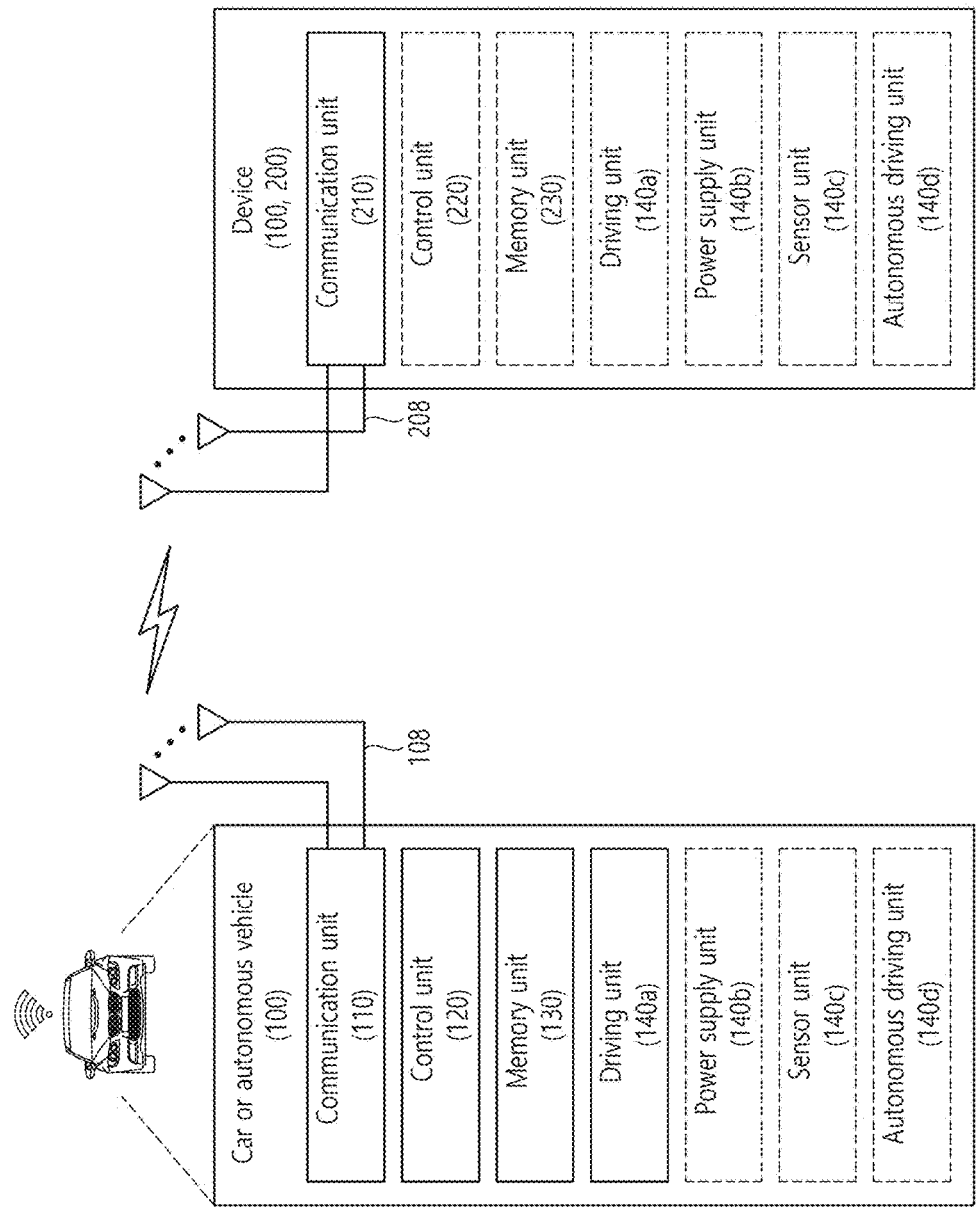
FIG. 23 shows a vehicle or an autonomous vehicle, based on an embodiment of the present disclosure.

FIG. 23 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 23, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 21, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

The scope of the disclosure may be represented by the following claims, and it should be construed that all changes or modifications derived from the meaning and scope of the claims and their equivalents may be included in the scope of the disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method comprising:
   selecting, by a first device, a first resource for transmitting a physical sidelink control channel (PSCCH) or a physical sidelink shared channel (PSSCH), based on a first sensing within a first sensing window;
   determining, by the first device, that the first resource is overlapped with a second resource, based on a second sensing within a second sensing window; and
   performing, by the first device, re-evaluation of the first resource,
   wherein an end time of the second sensing window is before a first time offset and a second time offset from a slot of the first resource,
   wherein a time of the re-evaluation is before the first time offset from the slot of the first resource, and
   wherein the end time of the second sensing window is before the second time offset from the time of the re-evaluation.

2. The method of claim 1, wherein the first time offset represents a minimum time required for reselection of a transmission resource, and
   wherein the second time offset represents a minimum time required for processing of information related to a sensing.

3. The method of claim 1,
   wherein the first sensing window precedes the second sensing window on a time domain.

4. The method of claim 1, wherein the slot of the first resource is included in a time resource duration determined based on a packet delay budget and a time when the first resource is selected.

5. The method of claim 1, wherein the first resource is reselected based on the re-evaluation.

6. The method of claim 1, wherein at least one of the first time offset and the second time offset is determined based on at least one of a resource reservation operation type, a resource configuration method type, a retransmission method type, a resource pool, a service type, a service priority, a cast type, a destination identifier (ID), a source ID, a quality of service (QOS) parameter, a congestion level, or a mode type.

7. The method of claim 1, wherein a PSSCH reference signal received power (RSRP) threshold related to the second sensing is independent of a PSSCH RSRP threshold related to the first sensing.

8. A first device comprising:
   at least one transceiver;
   at least one processor; and
   at least one memory connected to the at least one processor and storing instructions that, based on being executed, cause the first device to perform operations comprising:
   selecting a first resource for transmitting a physical sidelink control channel (PSCCH) or a physical sidelink shared channel (PSSCH), based on a first sensing within a first sensing window;
   determining that the first resource is overlapped with a second resource, based on a second sensing within a second sensing window; and
   performing re-evaluation of the first resource,
   wherein an end time of the second sensing window is before a first time offset and a second time offset from a slot of the first resource,
   wherein a time of the re-evaluation is before the first time offset from the slot of the first resource, and
   wherein the end time of the second sensing window is before the second time offset from the time of the re-evaluation.

9. The first device of claim 8, wherein the first time offset represents a minimum time required for reselection of a transmission resource, and
   wherein the second time offset represents a minimum time required for processing of information related to a sensing.

10. The first device of claim 8,
    wherein the first sensing window precedes the second sensing window on a time domain.

11. The first device of claim 8, wherein the slot of the first resource is included in a time resource duration determined based on a packet delay budget and a time when the first resource is selected.

12. The first device of claim 8, wherein the first resource is reselected based on the re-evaluation.

13. The first device of claim 8, wherein at least one of the first time offset and the second time offset is determined based on at least one of a resource reservation operation type, a resource configuration method type, a retransmission method type, a resource pool, a service type, a service priority, a cast type, a destination identifier (ID), a source ID, a quality of service (QOS) parameter, a congestion level, or a mode type.

14. The first device of claim 8, wherein a PSSCH reference signal received power (RSRP) threshold related to the second sensing is independent of a PSSCH RSRP threshold related to the first sensing.

15. A processing device adapted to control a first device, the processing device comprising:
    at least one processor; and
    at least one memory connected to the at least one processor and storing instructions that, based on being executed, cause the first device to perform operations comprising:
    selecting a first resource for transmitting a physical sidelink control channel (PSCCH) or a physical sidelink shared channel (PSSCH), based on a first sensing within a first sensing window;
    determining that the first resource is overlapped with a second resource, based on a second sensing within a second sensing window; and
    performing re-evaluation of the first resource,
    wherein an end time of the second sensing window is before a first time offset and a second time offset from a slot of the first resource,
    wherein a time of the re-evaluation is before the first time offset from the slot of the first resource, and
    wherein the end time of the second sensing window is before the second time offset from the time of the re-evaluation.

16. The processing device of claim 15, wherein the first time offset represents a minimum time required for reselection of a transmission resource, and wherein the second time offset represents a minimum time required for processing of information related to a sensing.

17. The processing device of claim 15, wherein the first sensing window precedes the second sensing window on a time domain.

18. The processing device of claim 15, wherein the slot of the first resource is included in a time resource duration determined based on a packet delay budget and a time when the first resource is selected.

19. The processing device of claim 15, wherein the first resource is reselected based on the re-evaluation.

20. The processing device of claim 15, wherein a PSSCH reference signal received power (RSRP) threshold related to the second sensing is independent of a PSSCH RSRP threshold related to the first sensing.

* * * * *